INVENTOR.
LYLE E. PACKARD,
BY
Wolfe, Hubbard, Voit & Osann
ATTORNEYS.

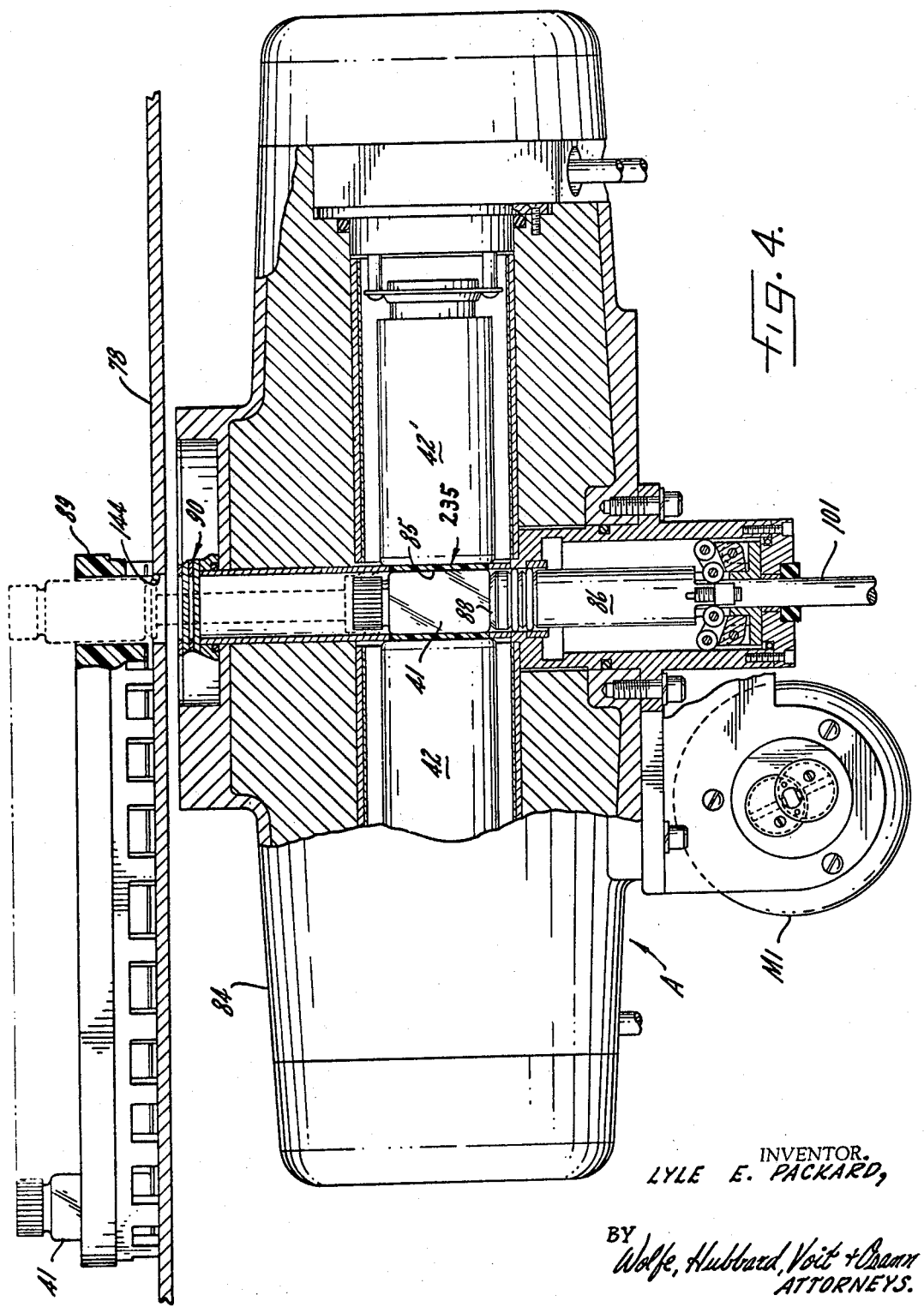

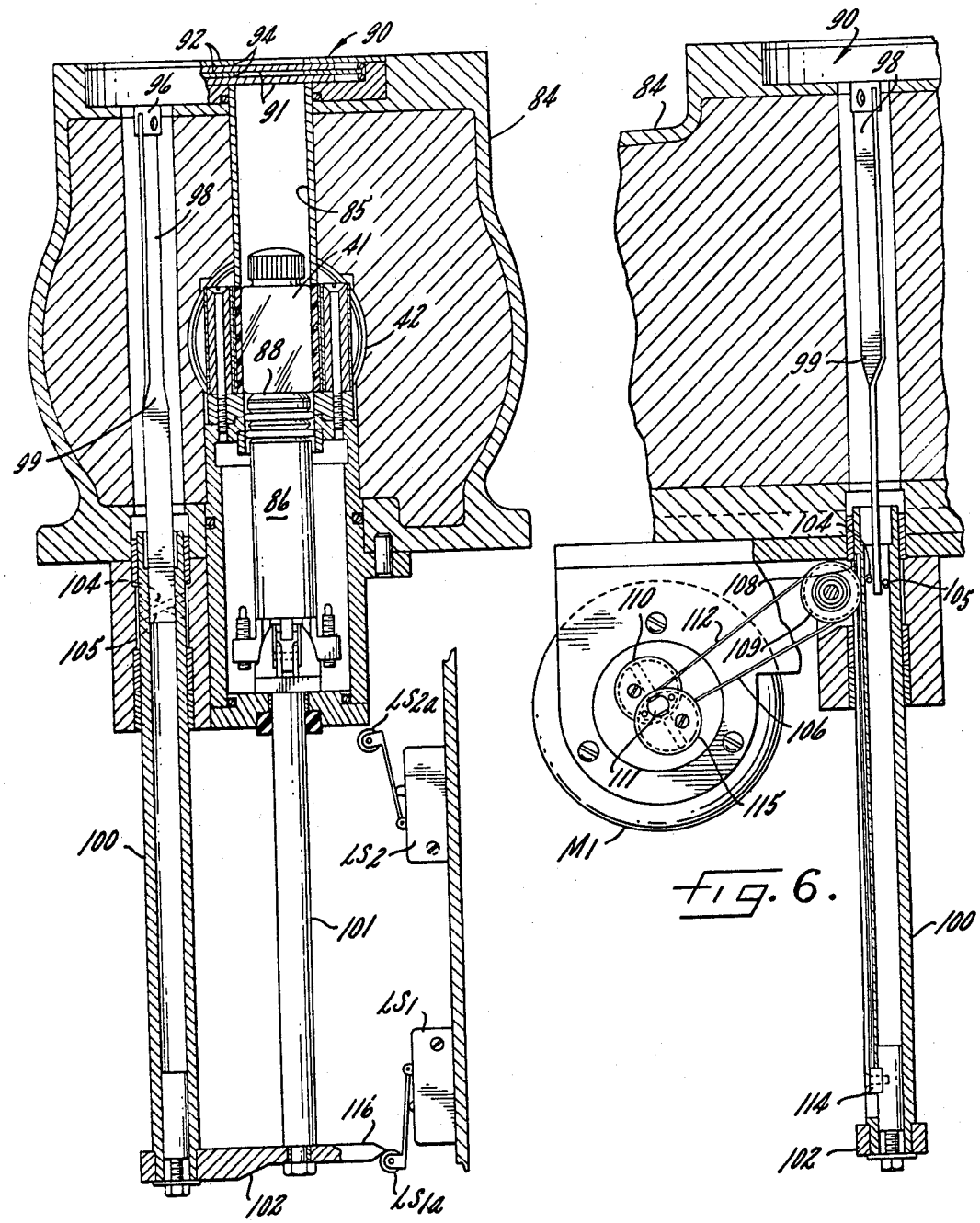

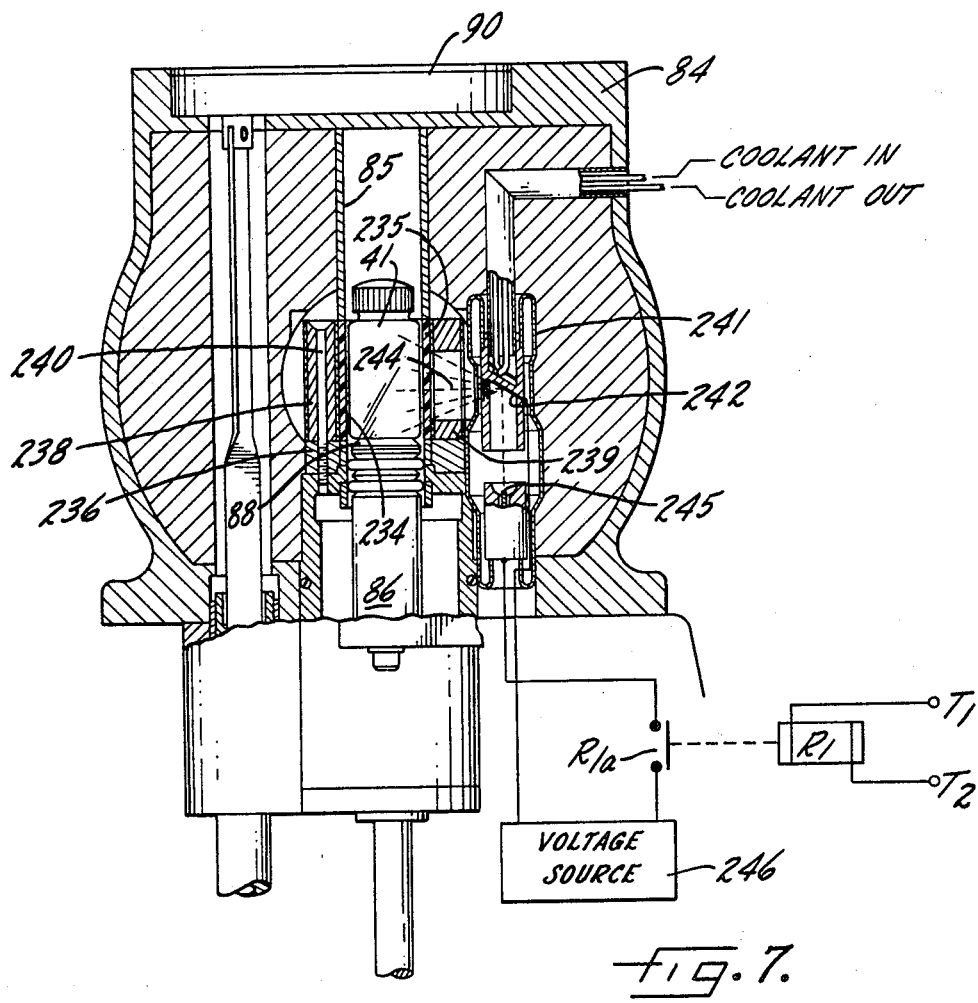

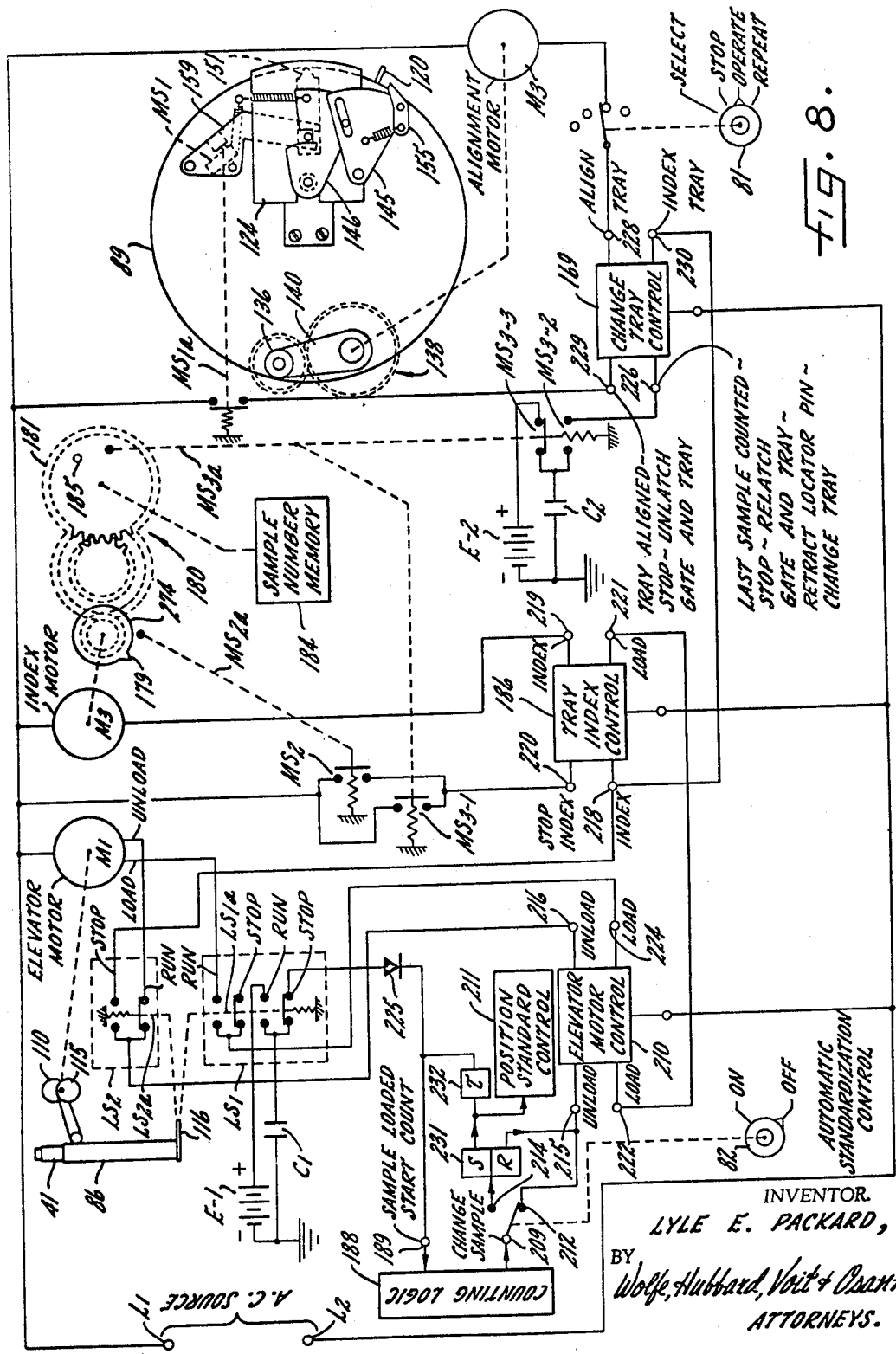

June 25, 1968            L. E. PACKARD            3,390,269
APPARATUS FOR AUTOMATIC STANDARDIZATION WITH EXTERNAL
STANDARDS IN LIQUID SCINTILLATION SPECTROMETRY
Filed June 18, 1964            9 Sheets-Sheet 9

INVENTOR.
LYLE E. PACKARD,
BY
Wolfe, Hubbard, Voit & Osann
ATTORNEYS.

United States Patent Office 3,390,269
Patented June 25, 1968

3,390,269
APPARATUS FOR AUTOMATIC STANDARDIZATION WITH EXTERNAL STANDARDS IN LIQUID SCINTILLATION SPECTROMETRY
Lyle E. Packard, Hinsdale, Ill., assignor to Packard Instrument Company, Inc., Downers Grove, Ill., a corporation of Illinois
Filed June 18, 1964, Ser. No. 376,064
12 Claims. (Cl. 250—71.5)

The present invention relates in general to liquid scintillation spectral analysis of test samples containing one or more radioactive isotopes disposed in a liquid scintillator and, more particularly, to liquid scintillation spectrometers which are wholly automatic in operation and which permit of corrective compensation for the effects of quenching and other phenomena such as instrument drift or line voltage drift, all of which tend to reduce counting efficiency. In its principal aspect, the invention is concerned with an improved apparatus for automatically exposing each of a plurality of radioactive test samples (either prior to or subsequent to measurement of the energy spectrum of the isotope contained therein) to a known quantum per unit time of radiant energy emanating from a normally inactive standard emitter characterized by its ability to produce in the liquid scintillator an observable spectrum of light energy typical of, for example, a beta emitter.

The invention disclosed herein relates generally to apparatus which constitutes a further modification of the invention disclosed and claimed generically in the copending application of Lyle E. Packard, Ser. No. 376,000 filed June 18, 1964, now U.S. Patent No. 3,188,468, and assigned to the assignee of the present invention.

It is a general aim of the present invention to provide improved radioactivity spectrometry equipment which permits of corrective compensation for the effect of quenching and similar phenomena that cause variation between the actual quantum of light photons emitted by any given scintillation and that detected, or variation in the total number of scintillations ocrurring in any given time period and the total number of scintillations detected in that period.

More particularly stated, it is an object of the invention to provide improved apparatus for automaticaly exposing a test sample including a vial containing a liquid scintillator and a radioactive isotope to an externally located source of impinging radiation, which source may, merely by way of example, constitute a normally inactive X-ray emitter, or other normaly inactive emitter of ionizing radiations, and wherein the emitter is characterized by its ability to produce a predetermined known energy spectrum in the form of scintillations occurring in the scintillator, thereby permitting comparison of the observed count of scintillations resulting from the composite effect of ionizing radiation emitted from the isotope and the source with the observed count of scintillations resulting from the isotope alone.

An ancillary object of the invention is to provide improved apparatus for automaticaly activating a normally inactive external radiation emitter capable of producing a known energy spectrum in a test sample containing a liquid scintillator and wherein the scintillations occurring in the liquid scintillator for each test sample are counted at least twice—once when exposed to radiations emitted from the activated standard emitter and once when the standard emitter is inactive, and wherein the second count is initiated and the standard emitter is either activated or inactivated as an incident to completion of the first count.

A related object of the invention is to provide improved spectrometry apparatus which will greatly facilitate and speed up the quantitative determination of counting efficiency.

A more detailed object of the invention is the provision of novel apparatus for automaticaly activating an external standard emitter of penetrating radiation so as to expose a test sample located in a counting chamber to a known quantum of ionizing radiation without requiring movement or manipulation of the sample, the emitter, or any other mechanical component, which apparatus is simple of construction and permits of ready installation on conventional spectrometer equipment now being utilized.

Other objects and advantages of the invention will become apparent as the following description proceeds, taken in conjunction with the accompanying drawings, in which:

FIG. 4 is an enlarged, fragmentary sectional view taken substantially along the line 4—4 of FIG. 3, depicting also a section through the supporting table and a sample tray, and here illustrating the elevator mechanism in the down or "sample loaded" position with the sample to be analyzed interposed between a pair of light transducers and with the shutter closed;

FIG. 5 is an enlarged vertical section taken substantially along the line 5—5 of FIG. 3, and illustrating particularly the details of the shutter actuating mechanism;

FIG. 6 is a fragmentary, vertical sectional view taken substantially along the line 6—6 of FIG. 3, here depicting the drive mechanism for effecting vertical movement of the elevator;

FIG. 7 is an enlarged fragmentary, vertical section similar to FIG. 5, here depicting in partial schematic form an exemplary apparatus embodying the invention for exposing a test sample to an external standard emitter;

FIG. 8 is a schematic wiring diagram illustrating the electrical controls for the exemplary form of the invention shown in FIG. 7;

Figure 13:
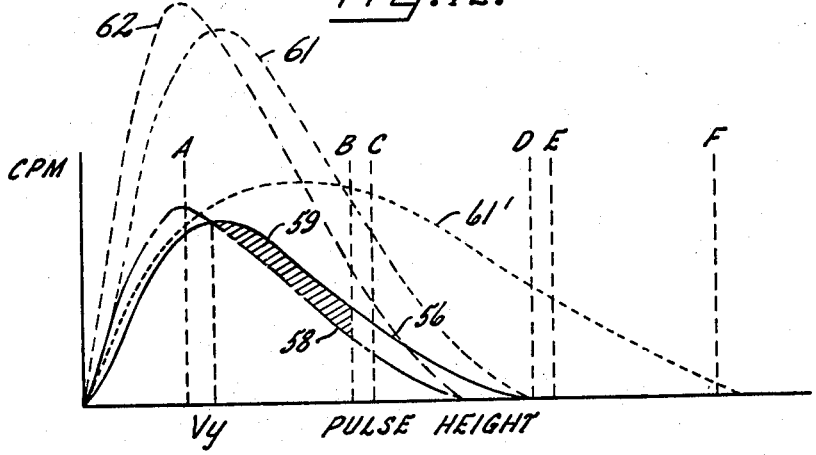
Figure 14:
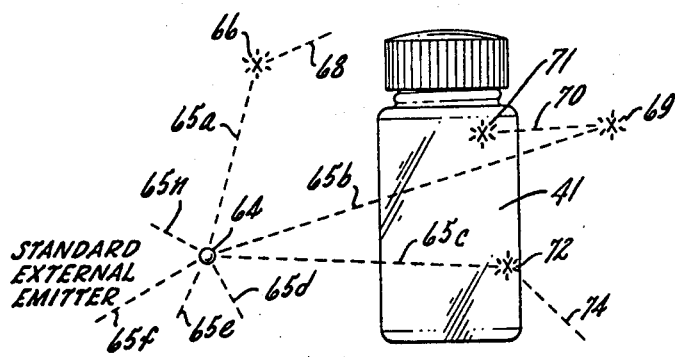

FIG. 13 is a graphic representation of typical pulse height spectra characteristic of beta emitting isotopes, here illustrating both a pure unquenched spectrum and a spectrum that might result because of quenching appearing in the liquid scintillation medium; and, FIG. 14 is a diagrammatic view depicting the creation of light scientillations as a result of "Compton" interactions occurring as a result of the emission of highly penetrating radiation.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the invention is to cover all modifications, equivalents and alternatives falling within the spirit and scope of the invention as expressed in the appended claims.

THE ENVIRONMENT OF THE INVENTION

Figure 11:
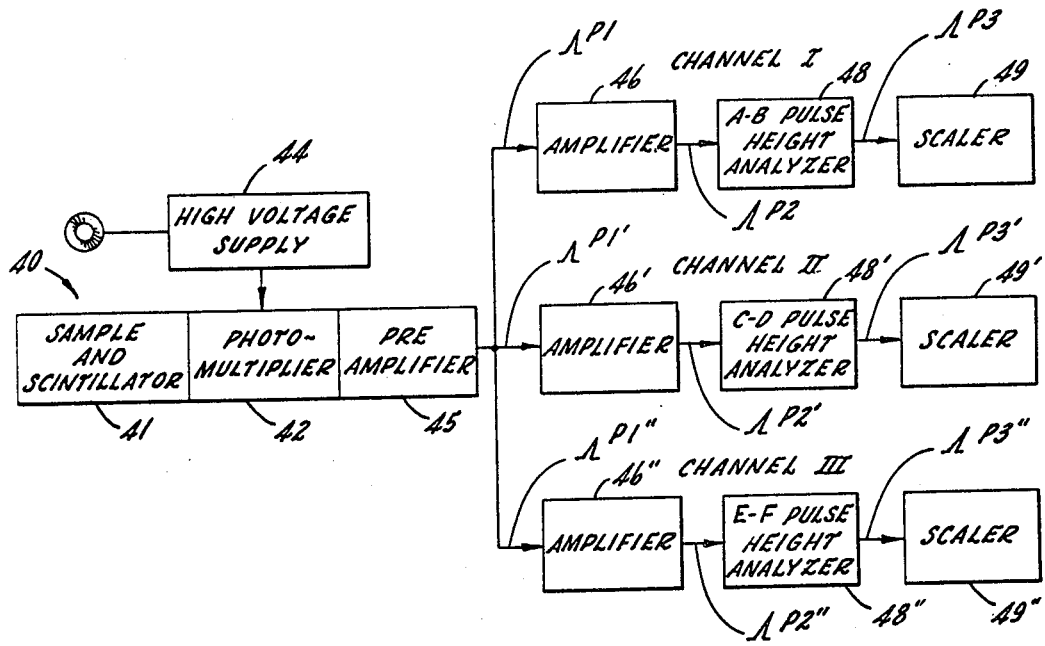
FIG. 11 is a simplified diagrammatic block-and-line representation of a conventional liquid scintillation spectrometer suitable for use in detecting and measuring radiations emanating from a test sample containing a radioactive source.

In order to facilitate an understanding of the ensuing description, it will be helpful to first consider briefly the environment in which the present invention finds particularly advantageous application. To this end, there is diagrammatically illustrated in FIG. 11 a conventional liquid scientillation spectrometer, generally indicated at 40, which, while not so limited in its application, is particularly suitable for analyzing test samples containing isotopes which produce radiation particles having relatively low penetrating power such, for example, as beta particles. In liquid scintillation spectrometers of the type illustrated, the isotope containing substance to be analyzed is dissolved, suspended, or otherwise mixed in a liquid scintillation medium comprising a solvent and one or more of numerous commercially available scintillators or florescent materials, the scintillation medium being contained within a vial having light-transmissive walls. For ease in reference, the isotope containing substance, scintillating medium, and vial will hereinafter be referred to as the "test sample," such test sample being shown diagrammatically at 41 in FIG. 11.

Typical solvents commercially used in liquid scintillation work are benzene, toluene, xylene and ethers such, for example, as dioxane, anisole, and methyl Cellosolve; however, the foregoing does not represent an exhaustive list of such solvents. The solvent frequently includes as a minor constituent therein, alcohols such as methanol, ethanol or glycol. Sometimes water is also present in the solvent.

(a) General organization and operation of liquid scintillation spectrometers When decay events occur in the isotope present in the test sample 41, radiation particles (e.g., beta particles) are emitted which coact with the scintillator molecules to produce light flashes. The amount of light produced by the decay event (i.e., the number of light photons) is substantially proportional to the energy of the decay event. The light flashes or scintillations are detected by a light sensitive device or light transducer such, for example, as a photomultiplier 42. The photosensitive cathode and the anode of the photomultiplier 42 are connected to a variable source of high voltage 44. Those skilled in the art will appreciate that those scintillations which produce sufficient light photons to trigger the photomultiplier will cause the latter to produce an electrical output signal, e.g., a voltage pulse, which is substantially proportional in amplitude to the energy of the corresponding decay event. Such output pulses from the photomultiplier 42 are passed through a suitable preamplifier 45 and then simultaneously to a plurality of parallel analyzing counting channels. Thus, those decay events occurring in the test sample 41 which trigger the photomultiplier 42 will produce identical input pulses P1, P1' and P1" for the three illustrative counting channels (here Channel I, Channel II and Channel III). Of course, it will be understood that the amplitude of the pulses can be controlled in various ways; for example, by suitable adjustment of the high voltage supply 44, the latter controlling the transfer function or gain of the photomultiplier 42.

Provision is made for separately analyzing the pulses P1, P1', P1" which are respectively presented simultaneously to the three analyzing channels so as to enable discrimination of the pulses in each channel on the basis of differences in their amplitudes. To this end, and considering Channel I for example, each input pulse P1 is first amplified in a linear amplifier 46 and then fed to a conventional pulse height analyzer 48 as an amplified pulse P2. Those skilled in the art will appreciate that such pulse height analyzers are characterized by their ability to discriminate pulses on the basis of their amplitudes, passing only those which fall within a preselected amplitude band or range of pulse heights, all other pulses being blocked. Thus, the pulse height analyzer 48 forms what is commonly referred to as a "window" having lower and upper limits or discriminators A, B (FIG. 12), such discriminators being adjustable through suitable means (not shown) well known in the art. Those pulses P2 which exceed in amplitude the lower discriminator A but do not exceed the upper discriminator B, are passed through the analyzer 48 as pulses P3, which are then fed to a scaler 49 or other suitable counting device.

Analyzing Channels II and III are substantially identical to Channel I described above, also including respective linear amplifiers 46', 46", pulse height analyzers 48', 48", and scalers 49', 49". However, in this instance the pulse height analyzers 48', 48" are adjusted to pass amplitude bands or ranges of pulses which are respectively different from one another and from the band of pulses passed by the analyzer 48 in Channel I. Consequently, the "window" formed by the analyzer 48' is defined by lower and upper discriminators C and D respectively (FIG. 12), while the "window" formed by the analyzer 48" is defined by the lower and upper discriminators E and F. Only those amplified pulses P2', P2" which respectively exceed in amplitude the discriminators C, E and do not respectively exceed the discriminators D, F are passed through the corresponding analyzers 48', 48" and presented to scalers 49', 49" as pulses P3', P3". Of course, while the A–B, C–D and E–F "windows" have been diagrammatically represented in FIG. 12 as being completely separate, it will be appreciated that they could be adjusted in various ways to suit different operating requirements. Merely by way of example, the discriminator B could be adjusted to a higher amplitude level than the discriminator C, in which case pulses having amplitudes in the range between B and C would be counted in both channels.

(b) Spectral distributions and factors affecting pulse height spectra

Beta emitting isotopes each have their own characteristic energy spectrum, such spectrum including a few decay events of near zero energy, a few decay events of maximum energy, and a majority of decay events having energies in the region between the lower and upper limits. Between the lower and upper limits, the spectrum rises to a peak and then falls. Since the light transducer or photomultiplier 42 produces pulses which are substantially proportional in amplitude to the energies of the corresponding decay events, the pulse height spectrum will, for a given gain of the photomultiplier, correspond to the energy spectrum of decay events. A characteristic pulse height spectrum for a typical beta emitter is graphically represented by the spectral curve 50 shown in FIG. 12. It will, of course, be understood that the area under the curve 50 is representative of the total number of output pulses from the photomultiplier and is, therefore, proportional to the total number of decay events occurring in the test sample.

Figure 12:
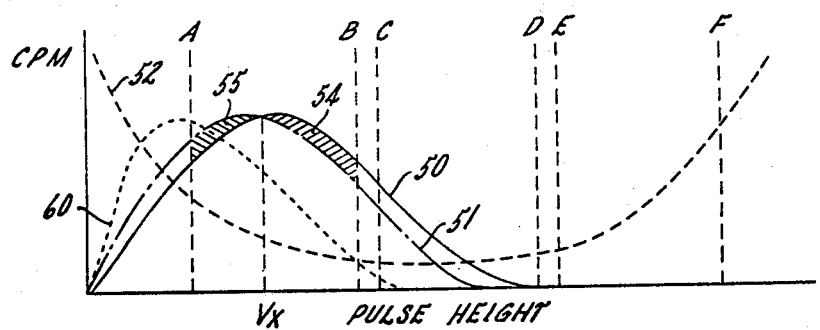
FIG. 12 is a graphic representation of typical pulse height spectra characteristic of beta emitting isotopes and illustrating particularly the principle of "balance point" operation.

A real problem often encountered in liquid scintillation spectrometry results from a phenomenon generally known as "quenching," a phenomenon which causes the pulse height spectrum representative of a given isotope to vary from that which would normally be observed when no quenching occurs. When the test sample 41 is prepared, a solvent for the scintillation medium is selected which is transparent and which has maximum light-transmitting characteristics. The vial which contains the sample is also carefully selected to insure that it will not impede the transmission of light photons to the photomultiplier. However, the substance containing the radioactive material to be assayed often has relatively poor light-transmitting characteristics. Merely by way of example, if the radioactive isotope is contained within a blood or urine sample, the test sample will be red or yellow in color rather than clear. Such red or yellow coloring of the test sample impedes the transmission of light from the scintillation flashes to the photomultiplier 42 so that the latter does not detect the same number of light photons as it would otherwise have detected had the test sample 41 been clear. Stated another way, the light produced in the scintillation medium by a given decay event is attenuated in its passage to the photomultiplier with a consequent attenuation of the output pulses from the photomultiplier. Moreover, since certain of the lower energy decay events produce only a few light photons, the effect of light attenuation in the test sample will, in some instances, prevent a sufficient number of light photons from reaching the photosensitive cathode so that no detectable response in the photomultiplier 42 is produced. The foregoing phenomenon is commonly referred to as "color quenching," and can be represented graphically as shown in FIG. 12 by the spectral curve 51. Thus, while the particular isotope being tested would, in the absence of quenching, produce a spectrum such as shown at 50, in the presence of such color quenching, the entire spectrum would shift downwardly (or to the left as shown at 51 in FIG. 12) because of light attenuation in the sample 41.

There is still another source of quenching error which introduces problems into liquid scintillation spectrometry techniques. This latter source of error is commonly referred to as "chemical quenching," and results from the presence of certain substances in the test sample which, irrespective of color, interfere with the conversion of radiation energy into light energy. Such substances cause a portion of the radiation energy to be dissipated as heat rather than producing light photons in the scintillation medium. The presence of chemical quenching can, in some instances involving relatively low energy decay events, prevent generation of a sufficient number of light photons to trigger the photomultiplier.

It will be apparent that chemical quenching will produce an effect similar to that produced by color quenching; i.e., the pulse height spectrum will be shifted to the left and represented by a curve 51 rather than the curve 50. And, of course, in certain instances the total effect may be cumulative—that is, the test sample may be subject to both chemical and color quenching.

When assaying test samples containing radioactive material having low activity levels, it is desirable that the spectrometer 40 (FIG. 11) be operated at, or near, optimum counting conditions so as to exclude from the count a large proportion of spurious signals, such as pulses representative of background noise, and to minimize the undesirable effects of shifts in the spectrum. Such background noise pulses may be produced by cosmic rays striking the scintillator, thus tending to produce spurious light flashes. Background noise may also result from the presence of contaminating isotopes such, for example, as $K^{40}$, present in the glass of the vial. While background noises are generally present throughout the entire range of pulse amplitudes, they predominate at the lower and higher pulse height ranges—there being a smaller proportion of background noises in the intermediate pulse height ranges. Thus, the amplitude distribution of background noises may be represented by the curve 52 shown in FIG. 12.

In order to operate the spectrometer 40 at, or near, optimum counting conditions, it is necessary to adjust the pulse height analyzer 48 so that counting efficiency in Channel I (the ratio of counts observed on the scaler 49 to the number of decay events occurring in the test sample 41) is high while the number of background counts are low—preferably the AB window should be adjusted so that the ratio $E^2/B$ (where E is counting efficiency and B is background noise) is maximized. To achieve this desirable objective, the AB window (FIG. 12) of the pulse height analyzer 48 should be wide, but not so wide that the number of background pulses included in the window are great in comparison with the number of pulses resulting from decay events in the test sample. Moreover, in order that the counting efficiency be as high as possible for a given window width, the AB window should embrace the peak portion of the pulse height spectrum 50.

A second factor important to optimum counting conditions is that of "balance point operation," an operation wherein the spectrometer 40 is adjusted so that it is relatively insensitive to slight shifts in the pulse height spectrum due to drift or changes in the system gain. Referring to FIG. 12, let it be assumed that the spectrum 50 shifts slightly to the left (e.g., to the position shown by curve 51). Such a shift might be due to color or chemical quenching as previously described or, alternatively, it might be due to undesirable drifting or lowering of the system gain or to changes in line voltage. However, in each instance the total activity level of the test sample 41 remains unchanged. Comparing the spectrum 51 with the spectrum 50, it will be observed that fewer pulses having amplitudes greater than $Vx$ will be passed through the AB window to the scaler 49, but more pulses having amplitudes less than $Vx$ will be passed through the window. In other words, pulses lost from the spectrum shift are represented by the shaded area 54, while pulses gained are represented by the area 55. As here illustrated, the two areas are substantially equal by virtue of the fact that the center of the selected AB window is adjusted to coincide approximately with the peak of the spectrum 50; i.e., so that a loss of pulses from a spectrum shift is "balanced" by a gain of pulses. Operation with ths spectrometer so adjusted is thus termed "balance point operation," and results in making the counting efficiency for a particular isotope substantially independent of minor, unavoidable drifts in the gain of the system. The balancing effect occurs whether the spectrum shifts slightly to the left or the right, although it will be appreciated that shifts due to quenching will be downward shifts—that is, to the left. From the foregoing explanation, it will be apparent that if the counting window (i.e., the AB window) is not adjusted for balance point operation, shifts in the spectrum could result in appreciable erroneous changes in the counting efficiency and the measured count rate. Therefore, it is desirable to operate in balance point operation whenever possible.

Occasionally, however, it is either not possible or not desirable to operate in balance point operation. Such inability to operate at balance point may, merely by way of example, be due to the particular spectrum representative of the isotope being counted. Referring to FIG. 13, there is illustrated a graphic representation of a pulse height spectrum 56 for a different beta emitting isotope. As here shown the peak of the spectrum 56 is located within the AB window but is not centered with respect thereto. If quenching occurs in the test sample, the spectral curve 56 will shift to the left as represented by the curve 58. The peak of the latter curve is here centered at approximately the lower discriminator A of the AB window. It will be noted that a few pulses which exceed in ampltiude $Vy$ are lost because of the shift, the loss in pulses being represented by the shaded area 59. Virtually no pulses are gained in this instance since the crossover point of the two curves approaches the lower discriminator A. Consequently, the number of pulses observed in the scaler 49 (FIG. 11) will be materially reduced because of quenching and the counting efficiency will be decreased.

Even when operating at balance point conditions, it is possible that a substantial number of pulses will be lost if the shift in the spectrum due to quenching is great enough. Such a shift is represented in FIG. 12 by the curve 60 wherein it will be observed that as the crossover point between a quenched and an unquenched spectrum approaches closer to the lower discriminator A, more and more pulses are lost. This is true even though the spectrometer 40 is adjusted to count an unquenched sample at balance point.

(c) *Quantitative determination of quenching and true sample activity levels*

In order to determine whether or not quenching is occurring in any given sample, it is merely necessary to monitor the ratio of observed counts in scaler 49 to the observed counts in scaler 49'. Considering FIG. 12 for example, if it is assumed that a slight shift in the pulse height spectrum occurs (as illustrated by the shift from curve 50 to curve 51), the number of observed counts in scaler 49 will remain substantially unchanged since the spectrometer is adjusted for balance point operation. However, since the area under curve 51 included within the CD window is substantially less than the area under the curve 50 in that window, the number of observed counts in scaler 49' will decrease, and the ratio of counts in scaler 49 with respect to counts in scaler 49' will, therefore, provide an indication that some quenching has occurred. On the other hand, should the shift from curve 50 be a substantial shift, for example, to the position shown at 60 in FIG. 12, the observed count in scaler 49 will drop—however, in this exemplary instance there will be virtually no observed counts in the scaler 49' and the ratio of counts in the two scalers will still change significantly.

Referring next to FIG. 13, it will be noted that the shift of the spectrum from curve 56 to curve 58 will also produce a significant change in the ratio of counts observed in the AB and CD windows, even though the spectrometer is not adjusted for balance point operation. Those skilled in the art will appreciate, therefore, that a change in the ratio of observed counts in the two scalers will occur irrespective of whether the spectrum shift is slight or great, and irrespective of whether or not one of the pulse height analyzers is set for balance point operation. However, while a ratio change as described above may be used as a quantitative index of quenching, there are situations where it does not give rise to satisfactory results.

In order to make a quantitative corrective computation to determine the amount of quenching in a quenched sample, thereby enabling the technician to determine the true radioactive strength of the sample, it is therefore, desirable to expose the test sample 41 to radiations emanating from a standard emitter after the sample has been initially counted. Merely by way of example, assume that the test sample 41 (FIG. 11) is suspected to have some quenching occurring in it. Such suspicion may be based upon either the physical appearance of the sample or upon detection of a ratio change in the two scalers when comparing the observed count from the test sample 41 with the corresponding observed count from a known standard of the same isotope. Let it also be assumed that the suspected test sample 41 initially yields a count of 6,000 c.p.m. (counts per minute) and that an internal standard of the same isotope, or an isotope having essentially the same beta energy spectrum, is then added to the test sample—the internal standard having a known radioactivity strength of 30,000 d.p.m. (decay events per minute). Dependent upon the particular instrument settings, such a known internal standard will have a known count rate—that is, if the instrument is set to count at 50% efficiency, the particular standard should produce, in an unquenched system, 15,000 c.p.m. in the scaler 49 (represented diagrammatically in FIG. 13 by the area in the AB window under the spectral curve 61 which is here representative of the energy spectrum of the internal standard in a pure unquenched system).

After the known internal standard is added to the test sample 41, the latter is subjected to a second counting procedure. Next, assume that during the second counting procedure the scaler 49 records 13,500 c.p.m. rather than the 6,000 c.p.m. recorded in the first counting procedure. Thus, the increase in observed counts on the scaler 49 is 7,500 c.p.m. rather than a 15,000 c.p.m. increase that would have been detected had the test sample 41 been unquenched. In this instance, the increase of 7,500 c.p.m. is represented by the area in the AB window under the curve 62, the latter being representative of the observed energy spectrum of the internal standard in a quenched system. Since the increased observed count resulting from the addition of the internal standard is only half of what would have been expected in an unquenched sample, it can readily be determined that the 6,000 c.p.m. recorded in scaler 49 during the first counting procedure represents only half of the count which would have been observed had the test sample 41 been unquenched. Therefore, the technician can record a true count, corrected for quenching, of 12,000 c.p.m. and, since the spectrometer 40 is adjusted to count at 50% efficiency, a true count rate of 12,000 c.p.m. is representative of an isotope having an activity level of 24,000 d.p.m.

The above procedure has heretofore been practiced by removing the sample 41 from the detection chamber and adding thereto known small volumes of a standard radioactive material, such material being termed the "internal standard." For example, such a procedure has been described by F. Newton Hayes in an article entitled "Liquid Scintillators: Attributes and Applications" published in the International Journal of Applied Radiation and Isotopes, 1956 vol. 1, pp. 46–56. However, this type of an operation suffers from certain disadvantages and inconveniences. In the first place, the manipulative steps of pipetting known amounts of a standard solution into the test vials, or manually adding solid standards thereto, are tedious and time consuming, particularly where a large number of quenched samples are being handled. Moreover, the pipetting operation requires considerable skill by the technician and, since the standard is a radioactive solution, spillage may occur which creates a health hazard and which occasionally contaminates other test samples. In addition, the radioactive strength per unit volume of some liquid standards does not remain stable due to evaporation of the solvent. In an effort to overcome this latter disadvantage, some standard solutions have been prepared wherein both the solvent and the radioactive solute are volatile, thus maintaining a generally stable radioactive strength per unit volume of the standard solution. However, where the radioactive solute is volatile, a substantial health hazard is created.

Contrasted with the "internal standardization" approach described above, those skilled in the art have also recognized that it is possible to produce an effect in a liquid scintillator similar to that produced by adding an internal standard, by exposing the scintillator to a standard external source of penetrating radiation, such, merely by way of example, as a gamma emitter. This procedure may be termed "external standardization" and has heretofore been described in an article entitled "Liquid Scintillators I. Pulse Height Comparison of Primary Solutes," Nucleonics, December 1955, vol. 13, No. 12, pp. 38–41, by F. Newton Hayes, Donald G. Ott, Vernon N. Kerr, and Betty S. Rogers, as well as in an article entitled "Liquid Scintillators II. Relative Pulse Height Comparisons of Secondary Solutes," Nucleonics, January 1956, vol. 14, No. 1, pp. 42–45, by F. Newton Hayes, Donald G. Ott and Vernon N. Kerr. As in the case of internal standards, external standardization has heretofore involved a tedious and time consuming operation wherein the standard is manually positioned each time that quenching is suspected and manually removed when it is desired to count without a standard.

Generally stated, external standardization techniques are based upon a phenomenon known as "Compton Scatter," a phenomenon wherein the interactions that occur between penetrating radiation and electrons that comprise part of the test sample produce electrons in the liquid scintillator having an energy spectrum similar in shape to that produced by a beta emitter. Referring to FIG. 14, it will be observed that a standard source 64 of penetrating radiation has been diagrammatically located exterior of and in proximity to a test sample 41, which here takes the form of a vial containing a liquid scintillator. As is characteristic of gamma emitters, or emitters of similar penetrating radiation, the source 64 will undergo a plurality of decay events in a given period of time, such decay events resulting in the emission of gamma rays in diverse directions represented by the broken lines 65a–65f, 65n. As here shown, the gamma radiation 65a has interacted at point 66 with matter (which may, for example, comprise molecules of the shield material), thus causing excitation of electrons. Under some circumstances, the energy of the gamma radiation may be totally absorbed, although more often the energy of the impinging gamma radiation is only partially absorbed. In the latter event, a photon will veer off randomly, in accordance with the principle of conservation of momentum, at a reduced energy level (as represented at 68) until a second Compton interaction (not shown) occurs.

The gamma radiation 65b shown diagrammatically in FIG. 14 has been depicted as passing entirely through the test sample 41 and then interacting with matter at point 69. Again assuming that the energy of the impinging gamma radiation 65b is only partially absorbed, it will be appreciated that a lower energy photon 70 will veer off in a random direction and may or may not again pass towards or through the test sample 41. Since the photon 70 is at a reduced energy level, the chances of producing a second Compton interaction are increased, and such an interaction is here shown occurring in the liquid scintillator at point 71. When the photon 70 interacts with matter at point 71, the energy of the photon will be either totally or partially absorbed, thus producing electrons and creating a light scintillation in the sample 41. A third gamma radiation 65c is here shown as interacting directly with matter at point 72 to produce a light flash therein. Again, the radiation may be either totally or partially absorbed and, in the latter event, a photon 74 of reduced energy will veer off in a random direction.

The net result of the foregoing is that Compton interactions occurring in the sample 41 will produce an observable energy spectrum which is similar to that produced by a beta emitter and which can, in some instances, also be represented by the curve 61 shown in FIG. 13. Consequently, if the isotope disposed in the test sample 41 happens to have an energy spectrum that is essentially the same as the energy spectrum 61 (FIG. 13), then it is possible to again determine the true activity level of the isotopes by the arithmetical computations set forth above. Of course, when the technician is dealing with internal standards, it is often relatively simple to select a standard of the same isotope as that located in the test sample or to select a standard that has an energy spectrum essentially similar to that of the isotope.

On the other hand however, when dealing with external standards or dissimilar isotopes, the most conventinoal practice involves the preparation of a set of a calibration curves (not shown) which are determined in advance for each different sample volume that may be encountered. This is done by preparing a series of samples of known activity for each different isotope that may be of interest. A different amount of quench material is then added to each sample in each series. The differently quenched samples in each series are then counted (1) in an environment free of any external standard so as to determine counting efficiency for each varying degree of quenching and (2) in an environment exposed to an external standard so as to determine the count efficiency for the external standard for each varying degree of quenching. Based upon the foregoing data, it is possible, in a manner well known to those skilled in the art, to prepare a set of calibration curves for each isotope of interest and for each sample volume that may be encountered. Thus, it is merely necessary to compare the two observed counts for each unknown test sample 41 (one count without a standard emitter and one count with a standard emitter) in order to determine counting efficiency, and thus, true sample activity levels.

When preparing calibration curves and measuring the true activity levels of test samples containing, for example, two radioactive isotopes of unknown strength in the manner set forth above, the technician can record the counts observed in the sample and produced by the standard in any of the three scalers 49, 49', 49''. However, normally the standard source is selected so that its energy spectrum 61' is greater than that of the isotopes being tested. Consequently, it is possible to adjust the EF window so that the latter passes only pulses generated by the standard source. In other words, the lower discriminator E for the EF window is set to exceed the maximum pulses that will be created by the isotope being tested. Consequently, any variation in the count recorded in the scaler 49'' represents the net change in counts resulting from decay events in the standard alone. If, on the other hand, the technician wished to use only a two channel system, it would be necessary to perform an additional arithmetical computation in order to subtract the counts in the AB, CD windows which are respectively created by the two isotopes from the total number of counts in those windows, it being understood that the total number of counts in each window is here representative of pulses generated by decay events in both the isotopes being measured and the standard.

GENERAL ORGANIZATION OF AN EXEMPLARY SAMPLE PROCESSING APPARATUS

Figure 1:
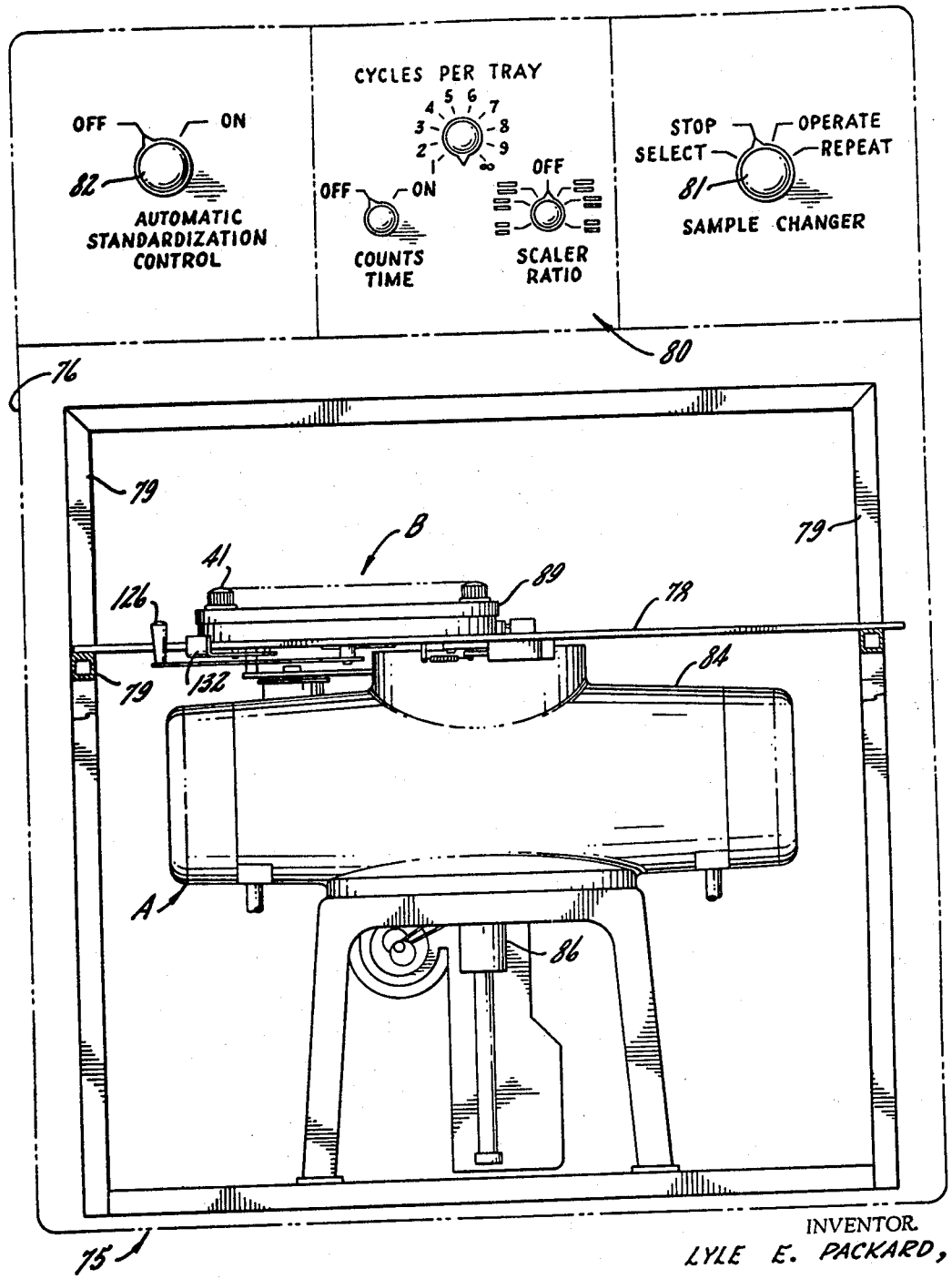
FIG. 1 is a front elevational view of an exemplary radioactive sample handling and measuring apparatus, here illustrating the component subassemblies of the apparatus housed in a suitable cabinet or console shown in phantom.

Referring now to FIG. 1, there is illustrated an exemplary automatic sample processing apparatus, generally indicated at 75, which is intended to transfer a plurality of samples one at a time in seriatim order to and from a a detection station. To this end, the exemplary apparatus 75 includes an elevator and detector mechanism, generally indicated at A, and a rotary tray alignment and indexing mechanism generally indicated at B.

As best illustrated in FIG. 1, the mechanisms A and B of the exemplary apparatus 75 are mounted in a console or cabinet 76 which is preferably refrigerated for the purpose of lowering the temperature to an equilibrium level so as to reduce thermal noise which otherwise tends to increase the level of spurious background signals. As here shown, the elevator and detector mechanism A is disposed in the lower end of the cabinet 76 with the rotary sample indexing mechanism B being physically mounted on a table 78 which overlies the upper end of the elevator and detector mechanism and is supported on the frame 79 of the apparatus 75. The cabinet or console 76 is dimensioned such that it defines a compartment 80 at its upper end which is suitable for receiving and mounting certain of the electrical components of the apparatus 75 such, for example, as printed circuit boards and the like (not shown). To provide for control of a sample changing and counting cycle, a plurality of manually operable switches are mounted on the front of the cabinet 76. The functions of two of the switches 81, 82, shown diagrammatically in FIG. 1, will be described more fully in conjunction with the control circuitry (FIGS. 8 and 9) for the exemplary apparatus. For the moment it should suffice to note that the switch 81 is a Mode Selector Switch, while the switch 82 is an Automatic Standardization Control Switch.

To facilitate an understanding of the present invention, the general organization and operation of the elevator and detector mechanism A will be briefly described hereinbelow. Those interested in a more complete operational and structural description of the mechanism A are referred to the copending application of Robert E. Olson, Ser. No. 273,110, filed Apr. 15, 1963, now U.S. Patent No. 3,198,948 and assigned to the assignee of the present invention.

Referring to FIGS. 1 and 4 conjointly, it will be noted that the elevator and detector mechanism A includes a base assembly 84 which houses a pair of light transducers, for example, photomultipliers 42, 42' disposed on opposite sides of a vertical elevator shaft 85. Mounted within the elevator shaft 85 is an elevator 86 having a platform 88 at its upper end for reception of one of the radioactive test samples 41 from the rotary indexing mechanism B and transporting the sample downwardly into the elevator shaft where it is aligned between the photomultipliers 42 and 42'. The samples 41 may, as heretofore indicated, simply comprise a vial or other suitable container within which is placed a liquid scintillator and the radioactive isotope or isotopes to be measured. Thus, as the isotope or isotopes undergo decay events, light scintillations are produced in the liquid scintillator, and such scintillations are then detected by the photomultipliers which produce electrical output signals in the form of voltage pulses corresponding to each light scintillation detected. At the completion of the counting cycle, the elevator 86 is returned upwardly to again position the sample 41 in the tray 89 from which it was removed. A shutter mechanism 90 is mounted on the upper end of the base assembly 84 for the purpose of preventing erroneous output signals from the photomultipliers 42, 42' resulting from environmental light. At the same time, the base assembly 84 is formed of suitable shielding material such, for example, as lead, which serves to minimize the amount of environmental ionizing radiation causing light flashes in either the scintillation medium or the photomultipliers.

Figure 3:
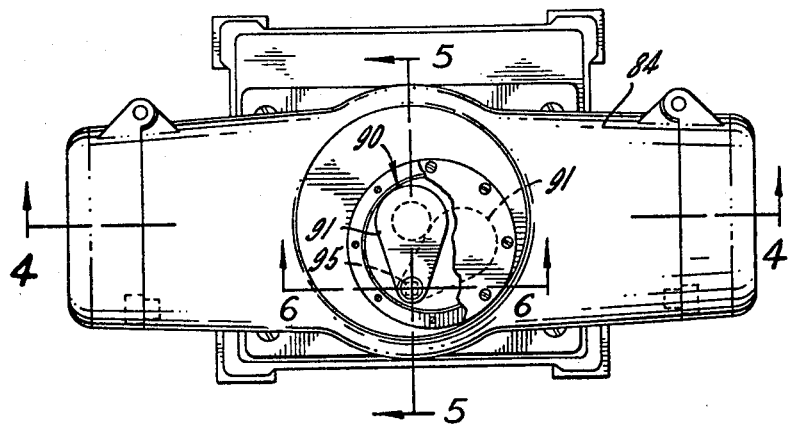
FIG. 3 is a plan view of the housing defining the detection chamber and the elevator mechanism for transferring samples to and from the detection chamber, here illustrating the mechanism with a portion of the shutter cover plate broken away and with its shutter in the closed position.

In order to insure that the shutter mechanism 90 is opened and closed in timed relationship with vertical movement of the elevator 86, the two devices are interconnected and actuated by a common reversible drive motor M1. Thus, referring to FIG. 5, it will be observed that the shutter mechanism 90 comprises a plurality of movable shutter blades 91 which are interleaved with a plurality of fixed shutter blades 92, the latter having apertures 94 therein aligned with the elevator shaft 85. The arrangement is such that when the movable blades 91 are pivoted about a point 95 (FIG. 3), they swing between limit positions to selectively open and close the upper end of the elevator shaft 85.

To effect such pivotal blade movement, the movable shutter blades 91 are rigidly secured to a stub shaft 96 in a manner more fully described in the aforesaid Olson U.S. Patent No. 3,198,948. Suffice it to say that the stub shaft 96 is rigidly secured to the upper end of a generally flat, depending shutter actuating shaft 98 having a twisted portion 99 intermediate its ends. The lower end of the actuating shaft is received within a tubular drive shaft 100, the latter being coupled adjacent its lower end to an elevator actuating shaft 101 by means of a bracket 102. A pair of dowel pins 104, 105 or similar cam means extend transversely through the tubular drive shaft 100 in closely spaced surrounding relation to the shutter actuating shaft 98.

The arrangement is such that as the drive shaft 100 starts to move vertically upward, force is transmitted through the bracket 102 and the elevator actuating shaft 101, thus starting the elevator 86 upwardly to unload the sample 41. Just prior to the time that the sample 41 reaches the shutter mechanism 90, the dowel pins 104, 105 traverse the twisted portion 99 of the shutter actuating shaft 98, rotating the latter about its own vertical axis and pivoting the movable blades 91 to the dotted line open position shown in FIG. 3. Further upward movement of the drive shaft 100 then causes the sample 41 to be ejected from the elevator shaft 85 as shown by the dotted line elevator and sample position in FIG. 4. During a sample loading cycle, the pins 104, 105 serve to cam the shutter actuating shaft 98 in the opposite direction immediately after the new sample passes through the aligned apertures 94 in the shutter mechanism 90, thus swinging the movable blades 91 to the solid line closed position shown in FIGS. 3 and 4.

To effect vertical movement of the drive shaft 100 and the elevator 86 for the purpose of introducing samples 41 into and ejecting such samples out of the elevator shaft 85, the drive shaft 100 is drivingly coupled to a conventional reversible motor M1 (FIG. 6). As here illustrated, this is accomplished by affixing one end of an elevator cable 106 to the drive shaft 100 at a point 108 intermediate the ends of the latter, the opposite end of the cable 106 being trained about an idler pulley 109 and a pulley 110 which is eccentrically mounted on the shaft 111 of the motor M1. A second elevator cable 112 is affixed to the lower end of the drive shaft 100 as indicated at 114, the cable 112 also being trained about the idler pulley 109 and about a second pulley 115 which is mounted eccentrically on the shaft of the motor M1. The arrangement is such that when the motor M1 is energized to run in a clockwise direction (as viewed in FIGS. 4 and 6) the cable 112 will "pay off" its pulley 115 while the cable 106 will simultaneously "pay on" its pulley 110, thus lowering the elevator 86, and any sample contained thereon, into the elevator shaft 85. Of course, it will be appreciated that counterclockwise movement of the motor M1 (as viewed in FIGS. 4 and 6) will serve to "pay out" the cable 106 and simultaneously "pay in" the cable 112, thus raising the elevator 86.

The energizing circuit for the motor M1 includes a lower limit switch LS1 (FIGS. 5 and 6) which is mounted on the frame of the elevator and detector mechanism A in a position to have its actuator LS1$_a$ depressed by a laterally projecting flange 116 mounted on the lower end of the elevator when the latter is in a down position with the sample 41 carried thereon aligned between the photomultipliers 42 and 42'. Depression of the actuator LS1$_a$ serves to deenergize the motor M1 and the apparatus is then ready for a counting cycle. A second limit switch LS2, included in a second energizing circuit for the motor M1, is mounted on the frame of the elevator and detector mechanism A in a position to have its actuator LS2$_a$ depressed by the flange 116 when the elevator arrives at its uppermost limit position with the sample 41 carried thereon having been returned to the tray 89 from which it was removed. Thus, the limit switch LS2 serves to deenergize the motor M1 when the elevator reaches its uppermost limit position. The energizing circuits for initiating clockwise and counterclockwise rotation of the motor M1 will be described more fully in conjunction with the control circuit shown in FIG. 8.

While those skilled in the art will appreciate that any of numerous conventional means can be utilized to transfer samples 41 one at a time in seriatim order to a point of registration with the elevator platform 88 (FIG. 4), it may be helpful to an overall understanding of the invention to briefly describe the general organization and operation of the exemplary rotary sample indexing mechanism B shown in FIG. 1. Those interested in a more complete operational and structural description of the mechanism B are referred to the copending application of Lyle E. Packard, Alfred A. Munn, Roy E. Smith and Edward F. Polic, Ser. No. 273,189, filed Apr. 15, 1963, now U.S. Patent No. 3,257,561 and assigned to the assignee of the present invention.

Figure 2:
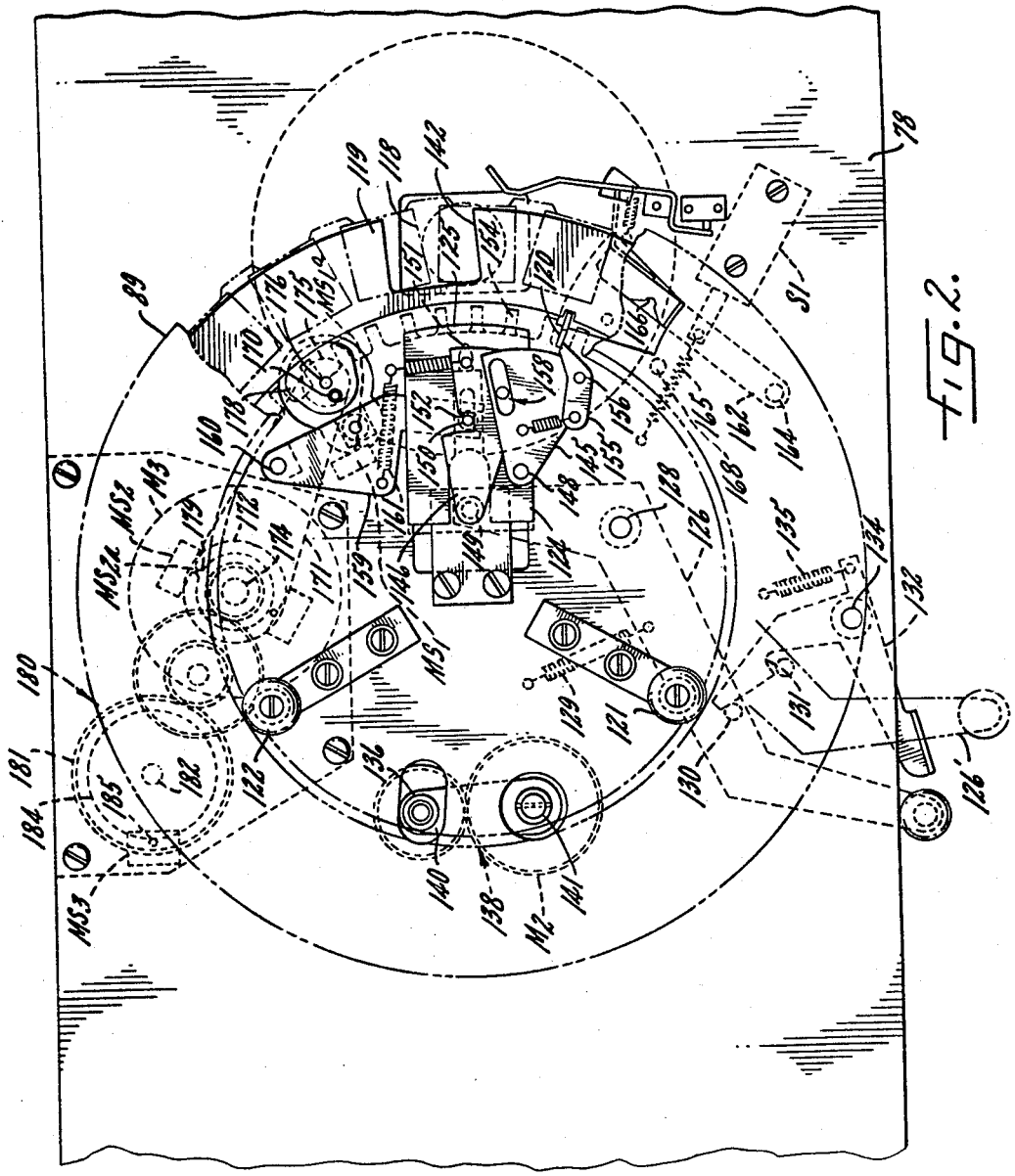
FIG. 2 is a fragmentary plan view of a mechanism for locating and indexing annular trays containing a plurality of test samples, here depicting the tray just prior to alignment and registration of its discharge aperture with the detection chamber.

Referring now to FIGS. 2 and 4 conjointly, it will be observed that the tray 89 utilized to transfer samples 41 to the elevator mechanism A is annular in configuration and defines a plurality of open ended compartments 118 each of which is capable of receiving a single test sample 41. Of course, each tray 89 may contain any number of samples from one sample to the full tray capacity which is determined by the number of compartments 118 in the tray (there being twenty-four such compartments in the exemplary tray 89). To prevent the samples from inadvertently dropping out of the tray, the lower ends of all of the compartments 118 are normally closed by means of an annular gate 119 which is mounted in the tray with freedom for relative sliding movement with respect thereto, but which is normally latched to the tray by means of a pivotal latch 120 (FIG. 2).

The particular means employed for locating the tray 89 forms no part of the present invention. Thus, those skilled in the art will appreciate that the trays 89 could be stored at a point remote from the table 78 and automatically transferred to the table one at a time in the manner described in the aforesaid Packard et al. U.S. Patent No. 3,257,561. However, to simplify the ensuing discussion, the tray alignment and indexing mechanism B will here be described in connection with a single tray 89 which is manually positioned on, and removed from, the table 78 by the technician.

For the purpose of properly orienting the tray 89 on the table 78, the latter has mounted thereon a pair of idler rolls 121, 122 which are fixed to the table for rotation about their own stationary vertical axes. A retractable slide 124, having a generally arcuate leading edge 125, is also mounted on the table in such a manner that when the slide is shifted outwardly, its arcuate leading edge 125 defines with the two idler rolls 121, 122 a three-point centering system which positively locates the tray 89 for indexing rotation about a fixed axis. To facilitate such indexing movement, the leading edge of the slide can, if desired, include one or more rollers (not shown) which are adapted to engage the inner peripheral wall of the tray.

In the illustrative device (FIGURE 2), the slide 124 is coupled to a manual actuating lever 126 which is pivoted at 128 to the table 78. A spring 129 having its opposite ends secured to respective ones of the table 78 and the lever 126, serves to normally urge the lever in a clockwise direction about its pivot 128 (as viewed in FIG. 2), thus biasing the slide 124 into operative engagement with the tray and centering the latter. For the purpose of holding the slide 124 in a retracted position, the operating lever 126 is provided with an upstanding lug 130 which is positioned for selective reception in a notch 131 formed in one arm of a generally L-shaped release lever 132. As here shown, the release lever 132 is pivoted to the table at 134 and normally biased in a counterclockwise direction (as viewed in FIG. 2) by a spring 135, the latter having its opposite ends bottomed on the table 78 and on the lever 132.

Thus, when the manual actuating lever 126 is in the position 126′ as shown in FIG. 2, it is held in that position with the slide 124 retracted by means of coaction between the lug 130 and the notch 131. In this condition, there is ample room for the technician to selectively raise and lower trays relative to the three-point centering system 121, 122, 125. When a new tray 89 is in position on the table, the technician need only pivot the release lever 132 in a clockwise direction about its pivot 134 (as viewed in FIG. 2), thus releasing the lug 130 from the notch 131, and permitting the forces exerted by the spring 129 to drive the slide 124 forward into engagement with the tray 89. When the technician is prepared to remove the tray 89, it is merely necessary to pivot the lever 126 in a counterclockwise direction until the lug 130 is again operatively engaged with the notch 131.

Once the tray 89 is properly located on the table 78, the technician need only turn the Mode Selector Switch 81 (FIGS. 1 and 8) to the ON or "operate" state and the tray 89 will thereafter be aligned and indexed in the same manner as that described in the aforesaid Packard et al. U.S. Patent No. 3,257,561. Thus, as will be described in conjunction with the control circuit shown in FIG. 8, when the switch 81 is turned to the "operate" state, an energizing circuit is completed for an alignment motor M2 which is operatively connected to a friction drive roller 136 through a gear train, generally indicated at 138 (FIGS. 2 and 8). The friction drive roller 136 is supported for rotation by an upstanding tubular post (not shown) carried on a lever arm 140, the latter being journaled for swinging movement about a fixed shaft 141 integrally secured to the table 78. Energization of the alignment motor M2 causes the friction drive roller 136 and the lever 140 to pivot (counterclockwise as viewed in FIG. 2) until the now driven roller 136 engages the inner peripheral edge of the tray 89. The tray 89 is, therefore, driven rapidly in a clockwise direction (as viewed in FIG. 2) towards a point where a discharge aperture 142 formed in the gate 119 is aligned with the elevator shaft 85 (FIG. 4). During the period when the gate 119 and tray 89 are latched together by latch 120, the discharge aperture 142 is centered with respect to a radial dividing wall on the tray between two adjacent compartments 118, thus inhibiting discharge of samples.

The exemplary apparatus 75 also provides for affirmatively latching the gate 119 to the table 78 when the discharge aperture 142 in the former is properly aligned with a discharge aperture 144 (FIG. 4) in the table and with the elevator shaft 85. To this end, a pair of levers 145, 146 are pivotally mounted on the slide 124 at 148, 149 respectively. As best shown in FIG. 2, it will be observed that during the alignment procedure, the lever 146 serves to lock an upstanding lug 150 integral with a locating pin 151 in place, the lug 150 being received within a notch 152 formed in the lever 146. Referring to FIGURE 2, it will be noted that the locating pin 151 is slidably mounted in the slide 124 for linear reciprocation into and out of gear teeth 154 formed in the inner peripheral wall of the tray. However, as long as the lug 150 is confined within the notch 152 in lever 146, the locating pin 151 is effectively precluded from engaging the gear teeth 154 in the tray 89.

As the tray 89 approaches its aligned position, the latch 120 on the tray approaches a pawl 155 which is pivotally mounted at 156 on lever 145. Engagement of the latch 120 and the projecting end of the pawl 155 cause the lever 145 to pivot (clockwise as viewed in FIG. 2) about its pivot 148. This serves, through a pin and slot connection 158, to also pivot the lever 146 clockwise about its pivot point 149, thus releasing the lug 150 from the notch 152 in lever 146. When this occurs, the locating pin 151 is driven forwardly into engagement with the gear teeth 154 on the tray 89, thus effectively stopping rotation of the latter. To accomplish this, the lug 150 is positioned between the arms of a bifurcated lever 159, the latter being pivoted to the table 78 at 160 and being biased in a counterclockwise direction about the pivot 160 by means of a spring 161. Thus, when the pin 150 is released from the notch 152 in the lever 146, the lever 159 pivots counterclockwise (as viewed in FIG. 2) to drive the located pin 151 into position between adjacent gear teeth 154 in the tray, thus latching the latter.

As the lever 159 pivots counterclockwise, it releases the actuator MS1$_a$ of a control microswitch MS1, thus causing several simultaneous operations to occur. First, the energizing circuit for the alignment motor M1 is broken, thus deenergizing the latter. Secondly, an energizing circuit for a solenoid S1 (FIG. 2) is broken, thus permitting a latching lever 162 to swing counterclockwise (as viewed in FIG. 2) about its pivoted connection 164 to the table 78 because of the force exerted thereupon by a biasing spring 165. As the lever 162 swings, a notch 166 formed therein registers with a locking pin 168 formed on the lower surface of the gate 119, thus effectively latching the gate to the table. At the same time, the lever 162 coacts with the latch 120 on the tray to disengage the tray 89 and its gate 119, thus freeing the tray for rotational indexing movement relative to the gate. Finally, the microswitch MS1 serves to complete an energizing circuit for an indexing motor M3.

The foregoing control circuits have been represented diagrammatically in FIG. 8 in block form as shown at 169. Those interested in ascertaining the details of the electrical systems represented by the block 169 are referred to the aforesaid Packard et al. U.S. Patent No. 3,257,561.

Referring now to FIGURE 2, it will be noted that the indexing motor M3 is coupled to a geneva drive pin 170 by means of an endless belt or chain 171. The latter is trained about a large drive sprocket 172 keyed to the drive shaft 174 of the motor M3 and a smaller drive sprocket 175 journaled for rotation about a shaft 176 which is rigidly secured to the upper end of the housing 84. In the exemplary apparatus, the drive sprocket 175 is rigidly secured to a cam 178, the latter serving to support the geneva pin 170 and also serving to cam the lever 159 (FIGURE 2) rearwarly once during each revolution of the cam. Thus, as the lever 159 moves rearwardly under the action of the cam 178, the locating pin 151 is withdrawn from its position between adjacent gear teeth 154, thereby freeing the tray 89 for indexing movement. At the same time, the geneva pin 170 engages the gear teeth 154 in the tray to index the latter.

The drive sprockets 172, 175 are preferably dimensioned such that the sprocket 175 makes two complete revolutions for each revolution of the output shaft 174 of the indexing motor. It will be appreciated, therefore, that by forming forty-eight gear teeth 154 in a twenty-four compartment tray 89, and by properly positioning the geneva pin 170, it is insured that for each full revolution of the motor shaft 174, the geneva pin 170 will move twice through a circular orbit. During each orbit the geneva pin enters the space between adjacent gear teeth 154 so as to index the tray 89 through an angular increment equal to the pitch P between adjacent gear teeth—i.e., through an angular increment equal to one-half the distance between the radial center lines of adjacent compartments 118. Consequently, the tray will be indexed from compartment to compartment for each full revolution of the motor shaft 174.

In order to deenergize the indexing motor M3 whenever the next successive compartment 118 in the tray 89 is aligned with the elevator shaft 85, a microswitch MS2 (FIGS. 2 and 8) is positioned so that once during each revolution of the motor shaft 174, a cam 179 formed on the latter engages and depresses the actuator MS2$_a$ of the microswitch, thus breaking the energizing circuit for the motor.

Of course, since the tray 89 initially starts out with the first and last sample compartments centered relative to the discharge aperture 142 in the gate 119, provision must also be made for deenergizing the motor M3 once during every twenty-four revolutions thereof (i.e., after the twenty-fourth sample 41 is returned to the tray) with the microswitch actuator MS2$_a$ and the cam 179 180 degrees out of phase. To this end, the motor shaft 174 is coupled through a suitable gear train 180 to an output gear 181, the latter being keyed to the shaft 182 of a rotary wafer switch 184 which here serves as a sample number memory. The gear train 180 is here selected such that the gear 181 makes one revolution for every twenty-four revolutions of the motor shaft 174. Therefore, it is merely necessary to position a microswitch MS3 (FIGS. 2 and 8) so that once during each revolution of the gear 181, the actuator MS3$_a$ of the microswitch is engaged and depressed by a cam 185 secured to the gear 181. Of course, the microswitch MS3 and the cam 185 are so positioned that they will coact only after an indexing step equal to the pitch P of the gear teeth 154 in the tray and only after the twenty-fourth sample is returned to the tray. At this time, the motor M3 is deenergized and the counting cycle for the tray is completed.

The foregoing control circuits for indexing the tray 89 have been represented diagrammatically in FIG. 8 in block form as shown at 186. Those interested in ascertaining the details of the electrical systems represented by the block 186 are referred to the aforesaid Packard et al. U.S. Patent No. 3,257,561.

PROGRAMMING LOGIC

Since methods and apparatus embodying the features of the present invention will normally be used with an associated programming control circuit, a typical programming system, generally indicated at 188 (FIGS. 8 and 10), will be briefly described hereinbelow. To this end and referring for the moment to FIG. 10, it will be observed that after a sample 41 has been properly positioned between the detector photomultipliers 42, 42', a signal is received on a terminal 189 (as explained more fully below) and passed over a line 190 to a program control 191. This signal indicates that a sample is "ready" for measurement. In response to such signal, the program control 191 passes a signal over lines 192 and 194 to open a gate 195 and start operation of a timer 196. During the predetermined interval measured off by the timer 196, voltage pulses produced by the photomultipliers 42, 42' are passed through an amplifier 198, and the open gate 195, to a scaler 199. At the end of the timed period, the timer supplies a signal over lines 200 and 201 to respectively close the gate 195 and indicate to the program control 191 that counting has been completed. In response to the signal received over line 201, the program control 191 first supplies an actuating signal over a line 202 to a printer 204. The latter is coupled to the scaler 199 by a channel 205 and thus prints out on a paper tape or the like the reading of the scaler 199. Following such "read out" by the printer 204, the program control 191 supplies signals over lines 206 and 208 to reset the scaler 199 and timer 196. At this time, the program control 191 also supplies a signal to a terminal 209 to signify that the sample in the detector should be changed.

Figure 10:
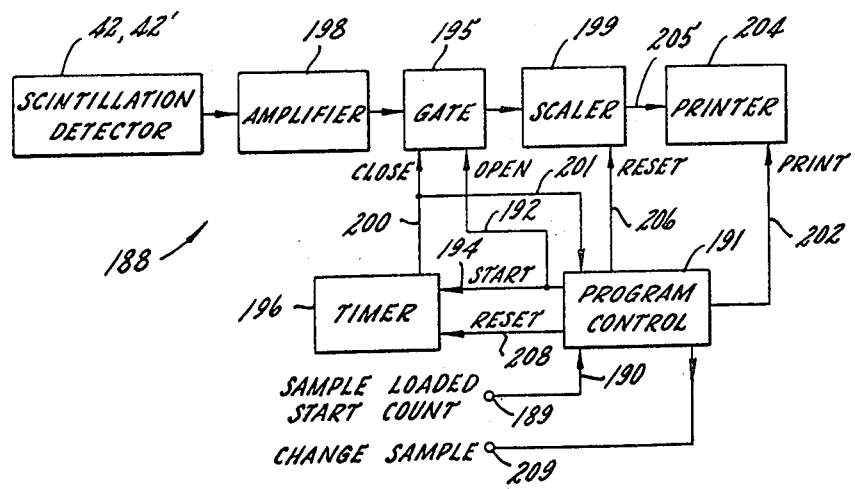
FIG. 10 is a block diagram of a conventional electrical system which accepts, counts, and records the output of a radiation detector.

Because the system shown diagrammatically in FIG. 10 may take any of a variety of forms known to those skilled in the art, it need not be illustrated or described in greater detail. It will be understood, however, that the "count" printed out by the printer 204 will include responses to background radiation which produces scintillation flashes in the liquid scintillator and which is received from extraneous sources, such background responses being in addition to the responses to radiation from the sample being measured. However, this "background count" can be first measured with no sample, or a sample of known radioactive strength in the detector. The background count can then be subtracted from each sample reading to arrive at an indication of the samples' radiation strength.

Besides counting the number of responses by the photomultipliers in a predetermined time interval (preset time operation), the time period required for the generation of a predetermined number of responses (preset count operation) may be measured and recorded, as is well known.

AUTOMATIC STANDARDIZATION WITH EXTERNAL STANDARDS ACCORDING TO THE PRESENT INVENTION

Thus far, the environment of the invention has been described in connection with the handling of a plurality of test samples and wherein (1) each sample 41 is delivered to a counting chamber, (2) the light scintillations occurring therein are counted and recorded, (3) the sample is then ejected and indexed, and (4) the next successive sample is delivered to the counting chamber. The present invention is concerned, however, with automatic standardization of such samples by the use of a normally inactive external standard or emitter, and wherein each sample is counted at least twice—once when exposed to radiations emanating from the standard emitter and once without being exposed to standard radiations.

In accordance with the present invention, provision is made for measuring the true activity levels of $n$ samples 41 by counting each of the $n$ samples at least twice—there being $n$ first counts representative of only decay events occurring in the isotopes present in the $n$ samples being analyzed, and $n$ second counts for the $n$ samples representative of a preselected band of scintillation of which at least a substantial number of the scintillations are created by radiations emanating from a standard emitter—and wherein one of the $n$ first or second counts is initiated automatically as an incident to completion of one of the $n$ second or first counts, yet wherein no manual manipulation of any of the test samples or a standard emitter is required. To accomplish this, and, as best illustrated in FIG. 8, the signal presented on the "change sample" terminal 269 of the counting logic 188 (FIGS. 8 and 10) is selectively passed either directly to an Elevator Motor Control Logic 210 (shown in block form in FIG. 8 and fully described in the aforesaid Packard et al. U.S. Patent No. 3,257,561), to automatically change samples, or directly to a Position Standard Control 211 which functions to automatically expose the sample 41 to standardized penetrating radiation during a second count cycle.

For this purpose, and as best illustrated in FIG. 8, the "Automatic Standardization Control Switch" 82 (FIG. 1) is utilized to permit the technician to selectively apply every signal appearing on the "change sample" terminal 209 either to the OFF terminal 212 controlled by the switch 82 (when standardization is not required) or, alternatively, to the ON terminal 214 controlled by the switch (when standardization is required). In the event that standardization is not required (i.e., the switch 82 is in the OFF position as shown in FIG. 8), the signal presented on the terminal 269 will be passed directly to the "unload" terminal 215 of the Elevator Motor Control 210. The Elevator Motor Control logic 210 (in a manner more fully described in the aforesaid Packard et al. U.S. Patent No. 3,257,561), then passes a control signal from its output "unload" terminal 216 through the "run" contacts of the limit switch LS2 to the "unload" terminal of the elevator motor M1, energizing the latter and starting an ejection or "unload" cycle for the elevator 86.

When the elevator 86 reaches its uppermost position, the flange 116 thereon (FIG. 5) engages the actuator LS2$_a$ of the limit switch LS2, opening the "run" contacts thereof and deenergizing the motor M1. The signal appearing on the unload terminal 216 is then passed through the "stop" contacts of the limit switch LS2 to the "index" terminal 218 of the "Tray Index Control" logic 186, thus energizing the index motor M3 through the output "index" terminal 219 of the logic 186. The tray 89 is now indexing towards the next sample compartment 118, and when that compartment is properly aligned with the elevator 86, the actuator MS2$_a$ of the microswitch MS2 is depressed by the cam 179, thus applying a "stop index" control signal to an input terminal 220 of the Tray Index Control 186. The logic 186 then passes a control signal from its output "load" terminal 221 to the "load" terminal 222 of the elevator control logic 210. The latter logic system then functions to energize the elevator motor M1 through the output "load" terminal 224 of the logic 210 and the now closed "run" contacts of the limit switch LS1. The elevator 86 now starts its downward or "load" cycle.

When the new sample 41 is properly positioned between the photomultipliers 42, 42' (FIG. 4), the flange 116 on the elevator mechanism engages the actuator LS1$_a$ of the limit switch LS1, opening the "run" contacts thereof and deenergizing the motor M1. At the same time, the "stop" contacts of the limit switch LS1 close, thus permitting a capacitor C1, which has theretofore been charged through the "run" contacts of the switch LS1 by a voltage source E1, to discharge through the "run" contacts and an asymmetrically conductive device, here shown as a diode 225, thus applying an input signal to the terminal 189 of the counting logic 188, which signal is effective to initiate a count cycle for the new sample 41.

The foregoing sequence of operations is repetitive until such time as the last sample 41 (here the twenty-fourth sample) has been returned to the tray 89. When this occurs, the cam 185 on gear 181 engages the actuator MS3$_a$ of the microswitch MS3, thus closing the normally open contacts MS3–1 and MS3–2 and opening the contacts MS3–3 controlled thereby. Closure of the contacts MS3–1 applies a control signal on the terminal 220 of the index logic 186 which is effective to terminate further indexing movement. At the same time, closure of the contacts MS3–2 permits a capacitor C2 (which had theretofore been charged by a voltage source E2 through contacts MS3–3) to discharge, thus applying a control signal on the "stop" terminal 226 of the "Change Tray Control" logic 169. The counting cycle is now complete.

To initiate a count cycle for a new tray 89, it is merely necessary to properly position the tray on the table 78 and then turn the Mode Selector Switch 81 (FIGS. 1 and 8) to the "operate" terminal, thus completing an energizing circuit for the Alignment Motor M3 from the "align tray" terminal 228 of the "Change Tray" logic 169. The tray 89 is then rapidly rotated until the latch 120 thereon engages the pawl 155, thus "uncocking" the tray locating pin 151 and releasing the actuator MS1$_a$ of the microswitch MS1. This applies a control signal to the "stop" terminal 229 of the "Change Tray" logic 169. Thereafter, an "index" signal is passed to the index terminal 218 of the "Tray Index" logic 186 from an output terminal 230 of the "Change Tray" logic 169. The new tray 89 now indexes and the first sample contained therein is loaded in the manner heretofore described.

Let it now be assumed that the technician desires to count the samples 41 contained in the new tray with automatic standardization thereof in accordance with the present invention. In this event, the selector switch 82 (FIGS. 1 and 8 is turned to the ON position so that when the count for the first sample has been recorded, the signal presented on the "change sample" terminal 209 of the counting logic 188 is now passed to the Automatic Standardization ON terminal 214.

In keeping with the invention, provision is made for passing alternate signals presented at the ON terminal 214 first to the "Sample Loaded" terminal 189 of the counting logic 188 so as to initiate a second counting cycle for the sample in the detection chamber and, second, to the "unload" terminal 215 of the elevator control logic 210 so as to change samples after the sample has been counted twice. To this end, the first signal presented on the ON terminal 214 is applied to the junction of a bistable flip-flop 231 to cause the latter to switch from its "reset" to flip 231 to cause the latter to switch from its "reset" to its "set" condition.

Since flip-flops of the exemplary bistable variety are well known to those skilled in the art, they will not be described herein in detail. Rather, the flip-flops have been illustrated symbolically as having a "set" section S and a "reset" section R with a junction therebetween. It will be understood that when a signal is presented at the junction of a bistable flip-flop the latter will shift from one state to the other.

Keeping the foregoing characteristics of conventional flip-flops in mind, it will be appreciated that the first signal presented on the terminal 214 will drive the flip-flop 231 to its "set" state, thus producing an output signal which is passed directly to the "Position Standard Control" logic 211 so as to automatically expose the sample 41 in the detection chamber to a standard emitter (in a manner to be described) without manipulation of either the sample or the standard. At the same time, the "set" section S of the flip-flop 231 passes a control signal through a time delay device 232 directly to the "sample loaded" 189 of the counting logic 188, thus initiating a second count cycle for the sample. In the exemplary form of the invention, the time delay device 232 serves only to delay initiation of the second count until such time that the sample 41 is exposed to standardized external radiation.

After the sample 41 has been counted a second time and the count recorded, the counting logic 188 will present another output signal at the "change sample" terminal 209. This signal will now be effective to switch the flip-flop 231 to its "reset" state, thus passing a control signal from the "reset" section R to the "unload" terminal 215 of the Elevator Motor Control Logic 210. The sample 41 is now unloaded in the manner previously described.

It will be appreciated that the system described will cycle on a repetitive basis so that each of the $n$ samples in the tray 89 is counted twice without having to remove it from the detection chamber—the first count representing the observed decay events in only the isotope being analyzed and the second count representing observed counts created at least in part by the standard emitter. Of course, those skilled in the art will appreciate that, in some instances, each sample could first be counted when exposed to the standard emitter and then recounted without being so exposed. In this latter event, the flip-flop 231 would be "set" initially so that the first signal on the "change sample" terminal 209 would be effective to "reset" the flip-flop.

Turning now to FIG. 7, there has been illustrated an exemplary apparatus for exposing test samples 41 to external standardized penetrating radiation in accordance with the present invention. As here illustrated, the test sample 41 is supported on the elevator platform 88 within a detection chamber defined by a vertical bore 234 formed in a "light pipe" 235, the bore 234 constituting a portion of the elevator shaft 85. The "light pipe" 235 is here mounted on a base 236 between a pair of upstanding sidewalls 238, 239, the entire assembly being rigidly secured to the housing 84 by a screw 240.

In keeping with the exemplary form of the invention, a source of standardized penetrating radiation is placed externally of, but adjacent to, the detection chamber defined by the "light pipe" 235. As here shown, the standardized source of penetrating radiation takes the form of an X-ray tube 241 which is mounted within the housing 84 and positioned so that its anode 242 is adjacent to a window 244 formed in and extending through the sidewall 236 of the assembly that supports the "light pipe" 235. It will be understood that the X-ray tube 241 is of conventional form and may be obtained from any of several commercially available sources. However those skilled in the art will appreciate that X-ray tubes of the type shown by way of example in FIG. 7 are characterized by their ability to generate a beam of penetrating X-rays when the anode 242 is subjected to impinging electrons emanating from the cathode 245 of the tube. To create such impinging electrons, and thus a beam of standardized X-ray radiation, it is merely necessary to connect the anode 242 and cathode 245 of the X-ray tube 241 to a source of energizing voltage, here shown diagrammatically as a voltage source 246.

For the purpose of selectively and alternately activating and deactivating the external source of standardized radiation, the energizing circuit for the tube 241 includes a set of normally open contacts R1a controlled by a relay R1 having energizing terminals T1, T2. The arrangement is such that when a voltage source is applied across the terminals T1, T2 of the relay R1, the latter is energized, thus closing the normally open contacts R1a and completing an energizing circuit for the X-ray tube 241. As a consequence, a beam of standardized X-ray radiation is generated at the anode 242 of the tube 241 and directed laterally therefrom through the window 244 and into any test sample 41 located in the detection chamber. Subjection of the test sample 41 to standardized external penetrating radiation creates light scintillations therein because of "Compton" interactions between the liquid scintillator and the impinging X-ray radiation in the manner previously described in conjunction with the description of FIG. 14.

Figure 9:
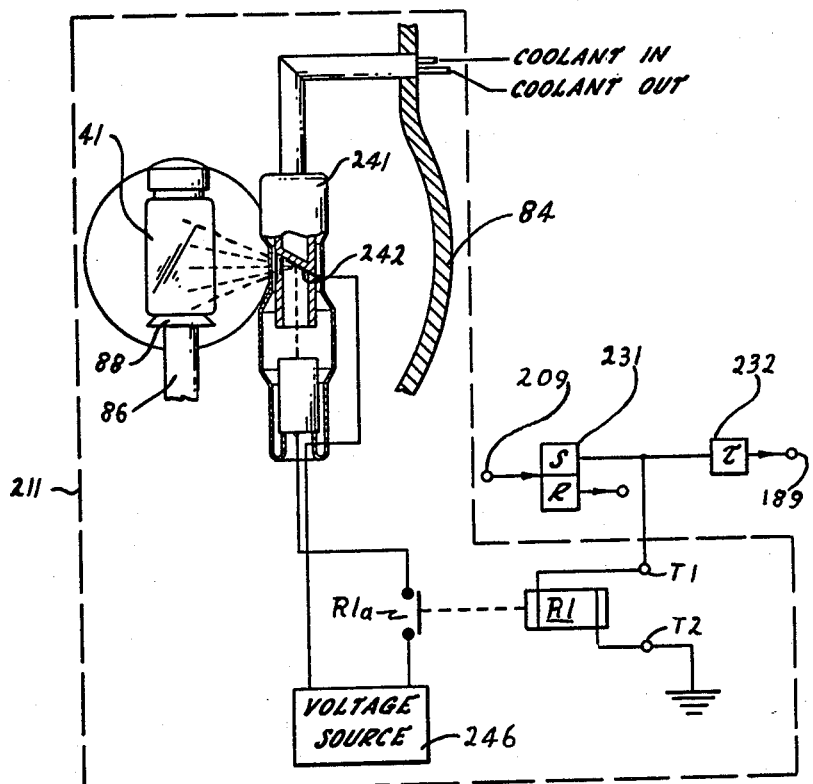
FIG. 9 is a fragmentary schematic wiring diagram of the control components utilized for activating a standard external emitter in accordance with the present invention.

Referring now to FIGS. 8 and 9 conjointly, it will be observed that the voltage source for energizing the relay R1 is here derived from the "set" section S of the flip-flop 231. Thus, when the counting logic 188 presents an output signal on the "change sample" terminal 209 indicative that a first count cycle has been completed, such signal is effective to switch the flip-flop 231 to the "set" condition (assuming that the Automatic Standardization Control switch 82 is in the ON state). When this occurs, a voltage source is applied across the terminals T1, T2 of the relay R1, thus energizing the latter, closing the contacts R1a, and activating the tube 241. The control signal from the "set" section S of the flip-flop is, after a short interval established by the time delay device 232, then applied to the "sample loaded" terminal 189 of the counting logic 188 to initiate the second count cycle. When the second count cycle is completed, a second control signal is applied on the terminal 209, thus switching the flip-flop 231 to the "reset" state. The tube 241 is, therefore, again deactivated and the sample 41 is unloaded from the detector assembly A.

In carrying out the invention, provision is made for increasing the efficiency of the apparatus by coating or otherwise forming the exterior surfaces of the "light pipe" 235 (other than the surfaces thereof that are adjacent the photomultipliers 42, 42' shown in FIG. 4), with a highly reflective material. Consistent with this aspect of the invention, the defining walls of the window 244 (FIG. 7) and the adjacent external surface of the X-ray tube 241 are preferably also coated with or formed of a light reflective material, thus insuring that any light directed outwardly through the window 244 is reflected back towards the detection chamber. Alternatively, the inner end of the window 244 (e.g., the end adjacent the "light pipe" 235) may be covered by a thin film of material having a low X-ray absorption coefficient such, merely by way of example, as a film of beryllium or the like (not shown), the inner surface of the latter being coated or otherwise formed of light reflective material.

It will be appreciated by those skilled in the art that the present invention is characterized by its simplicity and effectiveness in operation. Thus, when the technician suspects that counting efficiency is being reduced by quenching, the instrument drift, or line voltage drift, he need merely turn the Automatic Standardization Control switch 82 (FIGS. 1 and 8) to the ON condition. Thereafter, each test sample 41 introduced into the detector A is automatically counted twice, and upon completion of successive count cycle the X-ray tube is automatically activated and deactivated, thus alternately subjecting each test sample to, and isolating each sample from, external standardized penetration radiation.

Of course, while it will be understood that the present invention will find particularly advantageous use in conjunction with automatic sample changers of handling a plurality of samples on a repetitive basis, it is not necessarily restricted to use with a changer capable of handling a particular number of samples such as the twenty-four samples handled in the exemplary tray 89. To the contrary, the invention will find equally effective use in automatically processing any number $n$ of samples where "$n$" can be "1" or any whole number multiple thereof. Consequently, the term "$n$" as used in the appended claims is intended to connote any number of samples from a minimum of one sample to the maximum capacity of the sample changer, it being understood that each sample will be automatically subjected to two counting operations—one with and one without exposure to standardized radiation.

Those skilled in the art will also appreciate that an emitter of "standardized penetrating radiation" simply connotes an emitter of standardized radioactivity capable of producing a known energy spectrum—that is, an energy spectrum having a known shape and quantitatively representative of a known activity strength or level, for example, in terms of decay events or counts per unit of time such as d.p.m. (decay events per minute) or c.p.m. (counts per minute)—and it is in this context that such phrases are used in the appended claims.

I claim:

1. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, means for ejecting said test samples from said chamber after said counting means has counted at least certain of the output signals produced during two successive count cycles, a normally inactive emitter of penetrating radiation positioned adjacent said chamber, said normally inactive emitter being characterized in that penetrating radiation is emitted therefrom only while said emitter is activated so as to insure that said chamber and any sample therein are isolated from radiations emanating externally of the sample during periods of inactivation of said emitter, and means for activating said emitter upon completion of one of said two count cycles and for inactivating said emitter upon completion of the other of said two count cycles so that during one of said count cycles light scintillations are created in said liquid scintillator by the composite effect of decay events occurring in said isotope and interactions between said penetrating radiation and said liquid scintillator.

2. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, means for recording as first and second counts the output signals counted during successive count cycles, means for ejecting said test samples from said chamber upon recordation of said second count, a normally inactive emitter of penetrating radiation positioned adjacent said chamber, said normally inactive emitter being characterized in that penetrating radiation is emitted therefrom only while said emitter is activated so as to insure that said chamber and any sample therein are isolated from radiations emanating externally of the sample during periods of inactivation of said emitter, means responsive to recordation of one of said first and second counts for activating said emitter, and means responsive to recordation of the other of said first and second counts for deactivating said emitter so that during one of said successive count cycles light scintillations are created in said liquid scintillator by the composite effect of decay events occurring in said isotope and interactions between said penetrating radiation and said liquid scintillator.

3. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, a normally inactive emitter of penetrating radiation positioned adjacent said chamber, said normally inactive emitter being characterized in that penetrating radiation is emitted therefrom only while said emitter is activated so as to insure that said chamber and any sample therein are isolated from radiations emanating externally of the sample during periods of inactivation of said emitter, means responsive to completion of a first count cycle for activating said emitter and for initiating a second count cycle so that during said second count cycle light scintillations are created in said liquid scintillator by the composite effect of decay events occurring in said isotope and interactions between said penetrating radiation and said liquid scintillator, and means for ejecting said test samples from said chamber after said counting means has counted at least certain of the output signals produced during said second count cycle.

4. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, a normally inactive emitter of penetrating radiation positioned adjacent said chamber, said normally inactive emitter being characterized in that penetrating radiation is emitted therefrom only while said emitter is activated so as to insure that said chamber and any sample therein are isolated from radiations emanating externally of the sample during periods of inactivation of said emitter, means responsive to completion of a first count cycle for activating said emitter and for initiating a second count cycle so that during said second count cycle light scintillations are created in said liquid scintillator by the composite effect of decay events occurring in said isotope and interactions between said penetrating radiation and said liquid scintillator, means responsive to completion of said second count cycle for deactivating said emitter, and means for ejecting said test samples from said chamber after said counting means has counted at least certain of the output signals produced during said second count cycle.

5. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, means for ejecting said test samples from said chamber after said counting means has counted at least certain of the output signals produced during two successive counting cycles, an X-ray generator positioned adjacent said detection chamber, a voltage source, means for coupling said voltage source to said generator upon completion of one of said counting cycles and uncoupling said voltage source from said generator upon completion of the other of said counting cycles so that said generator is activated during one of said counting cycles and deactivated during the other of said counting cycles whereby during periods of activation of said generator the test samples positioned in said chamber is subjected to standardized impinging penetrating X-ray radiation and light scintillations are simultaneously created by (1) interactions between said penetrating radiation and the liquid scintillator and (2) decay events occurring in said isotope.

6. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, means for ejecting said test samples from said chamber after said counting means has counted at least certain of the output signals produced during two successive counting cycles, an X-ray tube mounted in said housing, said tube having a cathode and an anode with the latter adapted to emit standardized penetrating X-ray radiation, said tube positioned so that said anode is adjacent said detection chamber, a voltage source, means for coupling said voltage source to said anode and cathode upon completion of one of said counting cycles and uncoupling said voltage source from at least one of said anode and cathode upon completion of the other of said counting cycles so that said X-ray tube is energized during one of said counting cycles and deenergized during the other of said counting cycles whereby during periods of energization of said tube the test sample positioned in said chamber is subjected to standardized impinging penetrating X-ray radiation and light scintillations are simultaneously created by (1) interaction between said penetrating radiation and the liquid scintillator and (2) decay events occurring in said isotope.

7. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, means for ejecting said test samples from said chamber after said counting means has counted at least certain of the output signals produced during two successive counting cycles, an X-ray tube mounted in said housing, said tube having a cathode and an anode with the latter adapted to emit standardized penetrating X-ray radiation, said tube positioned so that said anode is adjacent said detection chamber, a window formed in said housing between said tube and said detection chamber for permitting unrestricted passage of X-ray radiation therethrough and into any test sample located in said chamber, said window having a light reflective surface facing said chamber, a voltage source, means for coupling said voltage source to said anode and cathode upon completion of one of said counting cycles and uncoupling said voltage source from at least one of said anode and cathode upon completion of the other of said counting cycles so that said X-ray tube is energized during one of said counting cycles and deenergized during the other of said counting cycles whereby during periods of energization of said tube the test sample positioned in said chamber is subjected to standardized impinging penetrating X-ray radiation and light scintillations are simultaneously created by (1) interaction between said penetrating radiation and the liquid scintillator and (2) decay events occurring in said isotope.

8. Radioactivity spectrometry apparatus for use in analyzing test samples of the type including a light transmissive sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, means for ejecting said test samples from said chamber after said counting means has counted at least certain of the output signals produced during two successive counting cycles, an X-ray tube mounted in said housing, said tube having a cathode and an anode with the latter adapted to emit standardized penetrating X-ray radiation, said tube positioned so that said anode is adjacent said detection chamber, a window formed in said housing between said tube and said detection chamber for permitting unrestricted passage of X-ray radiation therethrough and into any test sample located in said chamber, said window having a light reflective surface facing said chamber, said window defining an area having a low coefficient of X-ray absorptivity, a voltage source, means for coupling said voltage source to said anode and cathode upon completion of one of said counting cycles and uncoupling said voltage source from at least one of said anode and cathode upon completion of the other of said counting cycles so that said X-ray tube is energized during one of said counting cycles and deenergized during the other of said counting cycles whereby during periods of energization of said tube the test sample positioned in said chamber is subjected to standardized impinging penetrating X-ray radiation and light scintillations are simultaneously created by (1) interaction between said penetrating radiation and the liquid scintillator and (2) decay events occurring in said isotope.

9. Radioactivity spectrometry apparatus for use in analyzing test samples of the type including a light transmission sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occuring within said chamber, means for counting at least certain of the output signals produced, an X-ray tube positioned adjacent said detection chamber, a voltage source, means responsive to completion of a first count cycle for coupling said voltage source to said tube and for initiating a second count cycle so that during said second count cycle said tube is energized and the test sample positioned in said chamber is subjected to standardized impinging penetrating X-ray radiation whereby light scintillations are simultaneously created by (1) interaction between said penetrating radiation and the liquid scintillator and (2) decay events occurring in said isotope, and means ejecting said test samples from said chamber after said counting means has counted at least certain of the output signals produced during said second count cycle.

10. Radioactivity spectrometry apparatus for use in analyzing test samples of the type including a light transmission sample vial having a liquid scintillator and a radioactive isotope therein, said apparatus comprising, in combination, a housing defining a shielded detection chamber, means for introducing said test samples into said chamber one at a time in seriatim order, means supported in said housing and positioned adjacent said chamber for producing output signals proportional to the energy of light scintillations occurring within said chamber, means for counting at least certain of the output signals produced, an X-ray tube positioned adjacent said detection chamber, a voltage source, means responsive to completion of a first count cycle for coupling said voltage source to said tube and for initiating a second count cycle so that during said second count cycle said tube is energized and the test sample positioned in said chamber is subjected to standardized impinging penetrating X-ray radiation whereby light scintillations are simultaneously created by (1) interaction between said penetrating radiation and the liquid scintillator and (2) decay events occurring in said isotope, means responsive to completion of said second count cycle for uncoupling said voltage source and said tube to deenergize the latter, and means for ejecting said test samples from said chamber after said counting means has counted at least certain of the output signals produced during said second count cycle.

11. Radioactivity spectrometry apparatus for use in analyzing $n$ test samples of the type including a light transmissive sample vial having a liquid scintillator and a radioactive isotope disposed therein, said apparatus comprising, in combination, a housing defining a shielded detection chamber, means for introducing said $n$ test samples into said chamber one at a time, means for supporting a generator of standardized penetrating radiation adjacent to said chamber, a voltage source for selectively energizing said generator, said generator characterized by its ability to produce penetrating radiation having a known energy spectrum, means supported in said housing and positioned adjacent said chamber for producing output signals proportional to the energy of the light scintillations occurring within said chamber, means for recording as $n$ first counts at least certain of the output signals produced during a first count cycle, said recording means adapted to record as $n$ second counts at least certain of the output signals produced during a second count cycle, means for coupling said voltage source to said generator during one of said first and second count cycles and for uncoupling said voltage source and said generator during the other of said first and second count cycles, one of said $n$ first and second counts being representative of scintillations created by decay events occurring in the isotope present in said $n$ test samples when said generator is uncoupled from said voltage source, and the other of said $n$ first and second counts being representative of scintillations created by the composite effect of decay events occurring in the isotope present in said $n$ test samples and standardized penetrating radiation emanating from said generator when the latter is coupled to said source, and means for ejecting each of said $n$ test samples from said detection chamber upon recordation of the corresponding one of said $n$ second counts.

12. Radioactivity spectrometry apparatus for use in analyzing $n$ test samples of the type including a light transmissive sample vial having a liquid scintillator and a radioactive isotope disposed therein, said apparatus comprising, in combination, a housing defining a shielded detection chamber, means for introducing said $n$ test samples into said chamber one at a time, means for supporting a generator of standardized penetrating radiation adjacent to said chamber, a voltage source for selectively energizing said generator, said generator characterized by its ability to produce penetrating radiation having a known energy spectrum, means supported in said housing and positioned adjacent said chamber for producing output signals proportional to the energy of the light scintillations occurring within said chamber, means for recording as $n$ first counts at least certain of the output signals produced during a first count cycle, said recording means adapted to record as $n$ second counts at least certain of the output signals produced during a second count cycle, means responsive to recordation of said $n$ first counts for coupling said voltage source to said generator during said second count cycle, means responsive to recordation of said $n$ second counts for uncoupling said voltage source and said generator during the succeeding count cycle, said $n$ first counts being representative of scintillations created by decay events occurring in the isotope present in said $n$ test samples when said generator is uncoupled from said voltage source, said $n$ second counts being representative of scintillations created by the composite effect of decay events occurring in the isotope present in said $n$ test samples and standardized penetrating radiation emanating from said generator when the latter is coupled to said source, and means for ejecting each of said $n$ test samples from said detection chamber upon recordation of the corresponding one of said $n$ second counts.

References Cited
UNITED STATES PATENTS

| | | | |
|---|---|---|---|
| 2,924,718 | 2/1960 | Packard, et al. | 250—106 |
| 3,087,063 | 4/1963 | Gatzert | 250—106 |

FOREIGN PATENTS 957,186  5/1964  Great Britain.

ARCHIE R. BORCHELT, *Primary Examiner.*